United States Patent
Hiramatsu et al.

(10) Patent No.: US 9,945,446 B2
(45) Date of Patent: Apr. 17, 2018

(54) DRIVING SYSTEM FOR VEHICLE

(71) Applicant: HONDA MOTOR CO., LTD., Tokyo (JP)

(72) Inventors: Nobuyuki Hiramatsu, Wako (JP); Shigeru Nakayama, Wako (JP); Keiichi Ooiso, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 61 days.

(21) Appl. No.: 14/906,060

(22) PCT Filed: Dec. 22, 2014

(86) PCT No.: PCT/JP2014/083921
§ 371 (c)(1),
(2) Date: Jan. 19, 2016

(87) PCT Pub. No.: WO2015/098845
PCT Pub. Date: Jul. 2, 2015

(65) Prior Publication Data
US 2016/0230841 A1    Aug. 11, 2016

(30) Foreign Application Priority Data
Dec. 24, 2013    (JP) .................................. 2013-265801

(51) Int. Cl.
*F16H 1/00* (2006.01)
*B60W 50/02* (2012.01)
(Continued)

(52) U.S. Cl.
CPC .............. *F16H 1/003* (2013.01); *B60K 6/36* (2013.01); *B60K 6/365* (2013.01); *B60K 6/383* (2013.01);
(Continued)

(58) Field of Classification Search
None
See application file for complete search history.

(56) References Cited

U.S. PATENT DOCUMENTS 4,712,450 A    12/1987  Takamiya et al.
6,321,865 B1 *  11/2001  Kuribayashi ......... B60W 20/40
                                                    180/243
(Continued)

FOREIGN PATENT DOCUMENTS

DE    10 2004 032 070 A1    2/2005
EP         0 393 285 A1    10/1990
(Continued)

OTHER PUBLICATIONS

International Search Report dated Mar. 24, 2015, issued in counterpart Application No. PCT/JP2014/083921 (2 pages).

(Continued)

*Primary Examiner* — Ramya P Burgess
*Assistant Examiner* — Timothy Hannon
(74) *Attorney, Agent, or Firm* — Westerman, Hattori, Daniels & Adrian, LLP

(57) ABSTRACT

A driving system for a vehicle includes drive source, a driven portion, a unidirectional power transmitting unit provided on a power transmission path between the drive source and the driven portion, and having a first member, a second member, and an engaging element interposed between the first member and the second member, and an eccentricity acquiring unit adapted to acquire an eccentricity, the eccentricity being a magnitude of deviation between the rotational axis of the first member and the rotational axis of the second member.

9 Claims, 15 Drawing Sheets

(51) Int. Cl.

| | | |
|---|---|---|
| *B60K 6/387* | (2007.10) | |
| *F16D 48/06* | (2006.01) | |
| *B60K 6/36* | (2007.10) | |
| *B60K 6/383* | (2007.10) | |
| *B60K 6/442* | (2007.10) | |
| *B60K 6/52* | (2007.10) | |
| *B60K 6/54* | (2007.10) | |
| *B60L 15/20* | (2006.01) | |
| *B60W 10/00* | (2006.01) | |
| *F16D 41/07* | (2006.01) | |
| *B60K 6/365* | (2007.10) | |
| *F16D 41/06* | (2006.01) | |
| *F16H 1/32* | (2006.01) | |
| *B60W 20/50* | (2016.01) | |
| *B60W 20/15* | (2016.01) | |
| *B60W 20/00* | (2016.01) | |
| *B60K 6/38* | (2007.10) | |

(52) U.S. Cl.
CPC ............ *B60K 6/387* (2013.01); *B60K 6/442* (2013.01); *B60K 6/52* (2013.01); *B60K 6/54* (2013.01); *B60L 15/20* (2013.01); *B60W 10/00* (2013.01); *B60W 20/15* (2016.01); *B60W 20/50* (2013.01); *B60W 50/0205* (2013.01); *F16D 41/06* (2013.01); *F16D 41/07* (2013.01); *F16D 48/06* (2013.01); *F16H 1/32* (2013.01); *B60K 2006/381* (2013.01); *B60W 20/00* (2013.01); *F16D 2041/0603* (2013.01); *F16D 2500/10493* (2013.01); *Y02T 10/7258* (2013.01); *Y10S 903/91* (2013.01); *Y10S 903/913* (2013.01)

(56) References Cited

U.S. PATENT DOCUMENTS

| | | | |
|---|---|---|---|
| 2003/0085092 A1 | 5/2003 | Fukui et al. | |
| 2005/0096162 A1 | 5/2005 | Friedmann | |
| 2011/0010063 A1 | 1/2011 | OTa et al. | |
| 2012/0015772 A1* | 1/2012 | Kira | B60W 20/13 475/149 |
| 2012/0143426 A1* | 6/2012 | Yamamoto | B60W 20/13 701/22 |
| 2013/0244831 A1 | 9/2013 | Hiasa et al. | |

FOREIGN PATENT DOCUMENTS

| | | |
|---|---|---|
| JP | 2001-59532 A | 3/2001 |
| JP | 2005-321036 A | 11/2005 |
| JP | 2008-239041 A | 10/2008 |
| JP | 2012-50315 A | 3/2012 |
| JP | 2012-218563 A | 11/2012 |
| WO | 2012/070110 A1 | 5/2012 |

OTHER PUBLICATIONS

Partial Search Report dated Aug. 4, 2017, issued in counterpart European Application No. 14873695.2 (14 pages).

Extended (supplementary) European Search Report dated Nov. 16, 2017, issued in counterpart European Application No. 14873695.2. (12 pages).

\* cited by examiner

| VEHICLE STATES | FRONT UNIT | REAR UNIT | REAR MOTORS | OWC | BRK |
|---|---|---|---|---|---|
| STOP | × | × | STOP | OFF | OFF |
| TRAVELING FORWARDS AT LOW VEHICLE SPEEDS | × | ○ | POWER RUNNING DRIVE | ON | ON (WEAKLY APPLIED) |
| TRAVELING FORWARDS AT MIDDLE VEHICLE SPEEDS | ○ | × | STOP | OFF | ON (WEAKLY APPLIED) |
| REGENERATIVE DECELERATION | ○ | ○ | REGENERATIVE DRIVE | OFF | ON |
| ACCELERATION | ○ | ○ | POWER RUNNING DRIVE | ON | ON (WEAKLY APPLIED) |
| TRAVELING FORWARDS AT HIGH VEHICLE SPEEDS (NO DRIVING REQUIREMENT) | ○ | × | STOP | OFF | OFF |
| REVERSING | × | ○ | REVERSE POWER RUNNING DRIVE | OFF | ON |

FIG.4

DRIVING SYSTEM FOR VEHICLE

TECHNICAL FIELD

The present invention relates to a driving system for a vehicle in which a unidirectional power transmitting unit is provided on a power transmission path between a drive source and a driven portion.

BACKGROUND ART

Patent Literature 1 describes a vehicle driving system that includes a left wheel driving system having a first motor configured to drive a left wheel of a wheeled vehicle and a first planetary gear type speed changer provided on a power transmission path between the first motor and the left wheel and a right wheel driving system having a second motor configured to drive a right wheel of the wheeled vehicle and a secondary planetary gear type speed changer provided on a power transmission path between the second motor and the right wheel. In the first and second planetary gear type speed changers, the first and second motors are connected to sun gears respectively, the left wheel and the right wheel are connected to planetary carriers respectively, and ring gears are connected to each other. A brake and a one-way clutch are provided on the ring gears that are connected together. The brake brakes the rotation of the ring gear by releasing or fastening the ring gear. The one-way clutch is engaged when the rotational power of the motors side in one direction is inputted into the wheels side, is disengaged when the rotational power of the motors side in the other direction is inputted into the wheels side. The one-way clutch is disengaged when the rotational power of the wheels side in one direction is inputted into the motors side and is engaged when the rotational power of the wheels side in the other direction is inputted into the motors side.

It is described that in the vehicle driving system, when the rotational power of the motors side in the one direction is inputted into the wheels side, the brake is applied so that the motors and the wheels are put in a connected state and that when the vehicle speed reaches or exceeds a predetermined speed with the motors and the wheels being in the connected state, the brake applied is then released.

PRIOR ART LITERATURE

Patent Literature

Patent Literature 1:JP-A-2012-50315

SUMMARY OF THE INVENTION

Problem that the Invention is to Solve

In the vehicle driving system described in Patent Literature 1, there is a possibility that the brake is kept applied for a long period of time in such a situation that the wheeled vehicle cruises at a vehicle speed that is slower than the predetermined speed. Even in such a case, the conditions of the unidirectional power transmitting unit need to be grasped so that the unidirectional power transmitting unit is protected appropriately.

The invention provides a driving system for a vehicle that can protect a unidirectional power transmitting unit appropriately.

Means for Solving the Problem

The invention provides the following aspects.

A first aspect is characterized in a driving system (e.g., a rear wheel driving system 1 in embodiment) for a vehicle (e.g., a wheeled vehicle 3 in embodiment) including:

a drive source (e.g., a first and second motors 2A, 2B in embodiment);

a driven portion (e.g., rear wheels Wr in embodiment), which is driven by the drive source to propel the vehicle; and a unidirectional power transmitting unit (e.g., a one-way clutch 50 in embodiment), which is provided on a power transmission path between the drive source and the driven portion, and which is engaged when rotational power in one direction on a drive source side is inputted into a driven portion side, is disengaged when rotational power in the other direction on the power source side is inputted into the driven portion side, is disengaged when rotational power in one direction on the driven portion side is inputted into the drive source side, and is engaged when rotational power in the other direction on the driven portion side is inputted into the power source side, wherein:

the unidirectional power transmitting unit includes: a first member (e.g., an inner race 51 in embodiment); a second member (e.g., an outer race 52 in embodiment); and an engaging element (e.g., sprags 53 in embodiment) that is interposed between the first member and the second member, the first member and the second member having the same rotational axis and being able to rotate relatively; and the driving system includes an eccentricity acquiring unit (e.g., a controller 8 in embodiment), which acquires an eccentricity, the eccentricity being a magnitude of deviation between the rotational axis (e.g., a rotational axis O' in embodiment) of the first member and the rotational axis (e.g., a rotational axis O in embodiment) of the second member.

In addition to the configuration described in the first aspect, a second aspect is characterized in that the driving system further includes a connection/disconnection unit (e.g., hydraulic brakes 60A, 60B in embodiment), which is provided on the power transmission path in parallel to the unidirectional power transmitting unit so as to connect or disconnect the power transmission path by being applied or released.

wherein the eccentricity acquiring unit acquires the eccentricity when the connection/disconnection unit is applied to connect the drive source side and the driven portion side together.

In addition to the configuration described in the second aspect, a third aspect is characterized in that the driving system includes a connection/disconnection unit controller (e.g., the controller 8 in embodiment), which controls a release and an application of the connection/disconnection unit, wherein the connection/disconnection unit controller releases the connection/disconnection unit when the eccentricity acquiring unit acquires the eccentricity that is equal to or greater than a predetermined magnitude.

In addition to the configuration described in the third aspect, a fourth aspect is characterized in that when the eccentricity acquiring unit acquires the eccentricity that is equal to or greater than the predetermined magnitude with the drive source generating rotational power in the one direction, the connection/disconnection unit controller waits the release of the connection/disconnection unit until rotational power in the one direction becomes substantially zero.

In addition to the configuration described in the third aspect, a fifth aspect is characterized in that when the eccentricity acquiring unit acquires the eccentricity that is equal to or greater than the predetermined magnitude with the drive source generating the rotational power in the one direction, the connection/disconnection unit controller keeps the application of the connection/disconnection unit until a command to the drive source is switched to a command commanding the drive source to generate rotational power in the other direction, and releases the connection/disconnection unit after the drive source ends generating the rotational power in the one direction and before the drive source starts generating the rotational power in the other direction.

In addition to the configuration described in the fifth aspect, a sixth aspect is characterized in that:

the vehicle is a wheeled vehicle (e.g., a wheeled vehicle 3 in embodiment);

the driven portion is a wheel (e.g., rear wheels Wr in embodiment) of the wheeled vehicle;

the wheeled vehicle includes a brake unit, which brakes a rotation of the wheel; and when the connection/disconnection unit is released before the drive source starts generating rotational power in the other direction, the brake unit is caused to generate a braking force that complements rotational power in the other direction so as to compensate for a delay in start of generating rotational power in the other direction from the drive source.

In addition to the configuration described in the third aspect, a seventh aspect is characterized in that:

the vehicle is a wheeled vehicle (e.g., a wheeled vehicle 3 in embodiment);

the driven portion is a first drive wheel (e.g., a rear wheel Wr in embodiment) which is either of a front wheel and a rear wheel of wheels of the wheeled vehicle;

the wheeled vehicle includes another drive source (e.g., an internal combustion engine 4, a motor 5 in embodiment), which is configured to drive a second drive wheel (e.g., a front wheel Wf in embodiment) which is the other of the front wheel and the rear wheel; and when the eccentricity acquiring unit acquires the eccentricity that is equal to or greater than the predetermined magnitude with the another drive source generating rotational power in the one direction, the connection/disconnection unit controller releases the connection/disconnection unit.

In addition to the configuration described in any one of the third to seventh aspects, an eighth aspect is characterized in that:

the driving system includes a drive source controller (e.g., the controller 8 in embodiment), which controls rotational power generated by the drive source; and the drive source controller controls so that rotational power in the other direction is generated from the drive source when the connection/disconnection unit controller releases the connection/disconnection unit.

In addition to the configuration described in the eighth aspect, a ninth aspect is characterized in that the engaging element of the unidirectional power transmitting unit is interposed so that an inclined angle increases as rotational power in the one direction of the drive source increases; and the drive source controller determines a generation amount (e.g., a generating time, a generating rate in embodiment) of rotational power in the other direction based on a maximal inclined angle (e.g., a maximal inclined angle α in embodiment) of the engaging element that is obtained based on a maximal generated rotational power in the one direction that is generated by the drive source.

In addition to the configuration described in any one of the second to ninth aspects, a tenth aspect is characterized in that the driving system further includes a counting unit, which acquires a fact that the drive source generates rotational power in the one direction whose magnitude is equal to or greater than a predetermined magnitude when the connection/disconnection unit is applied to connect the drive source side and the driven portion side together, and then which stores a generation number of times, wherein the eccentricity acquiring unit estimates the eccentricity based on the generation number of times stored in the counting unit.

In addition to the configuration described in the tenth aspect, an eleventh aspect of the invention is characterized in that the predetermined magnitude is determined based on a rotational power transmission capacity (e.g., a weakly applied limit transfer torque T1 in embodiment) of the connection/disconnection unit.

A twelfth aspect is characterized in a driving system (e.g., a rear wheel driving system 1 in embodiment) for a vehicle (e.g., a wheeled vehicle 3 in embodiment) including:

a drive source (e.g., a first and second motors 2A, 2B in embodiment);

a driven portion (e.g., rear wheels Wr in embodiment), which is driven by the drive source to propel a vehicle;

a unidirectional power transmitting unit (e.g., a one-way clutch 50 in embodiment), which is provided on a power transmission path between the drive source and the driven portion, and which is engaged when rotational power in one direction on a drive source side is inputted into a driven portion side, is disengaged when rotational power in the other direction on the power source side is inputted into the driven portion side, is disengaged when rotational power in one direction on the driven portion side is inputted into the drive source side, and is engaged when rotational power in the other direction on the driven portion side is inputted into the power source side;

a connection/disconnection unit (e.g., hydraulic brakes 60A, 60B in embodiment), which is provided on the power transmission path in parallel to the unidirectional power transmitting unit so as to connect or disconnect the power transmission path by being applied or released; and a connection/disconnection unit controller (e.g., the controller 8 in embodiment), which controls a release and an application of the connection/disconnection unit, wherein:

the driving system further includes a counting unit (e.g., a controller 8 in embodiment), which acquires a fact that the drive source generates rotational power in the one direction whose magnitude is equal to or greater than a predetermined magnitude when the connection/disconnection unit is applied to connect the drive source side and the driven portion side together, and then which stores a generation number of times; and the connection/disconnection unit controller controls the connection/disconnection unit based on the generation number of times stored in the counting unit.

In addition to the configuration described in the twelfth aspect, a thirteenth aspect is characterized in that the connection/disconnection unit controller releases the connection/disconnection unit when the generation number of times stored in the counting unit is equal to or greater than a predetermined number of times.

In addition to the configuration described in the twelfth or thirteenth aspect, a fourteenth aspect is characterized in that the predetermined magnitude is determined based on a rotational power transmission capacity (e.g., a weakly applied limit transfer torque T1 in embodiment) of the connection/disconnection unit.

In addition to the configuration described in the thirteenth aspect, a fifteenth aspect is characterized in that when the generation number of times is equal to or greater than the predetermined number of times with the drive source generating rotational power in the one direction, the connection/disconnection unit controller waits the release of the connection/disconnection unit until rotational power in the one direction becomes substantially zero.

In addition to the configuration described in the thirteenth aspect, a sixteenth aspect is characterized in that when the generation number of times is equal to or greater than the predetermined number of times with the drive source generating rotational power in the one direction, the connection/disconnection unit controller keeps the application of the connection/disconnection unit until a command to the drive source is switched to a command commanding the drive source to generate rotational power in the other direction, and releases the connection/disconnection unit after the drive source ends generating rotational power in the one direction and before the drive source starts generating rotational power in the other direction.

In addition to the configuration described in the sixteenth aspect, a seventeenth aspect is characterized in that:

the vehicle is a wheeled vehicle (e.g., a wheeled vehicle 3 in embodiment);

the driven portion is a wheel (e.g., a rear wheel Wr in embodiment) of the wheeled vehicle:

the wheeled vehicle includes a brake unit, which brakes a rotation of the wheel; and when the connection/disconnection unit is released before the drive source starts generating rotational power in the other direction, the brake unit is caused to generate a braking force that complements rotational power in the other direction so as to compensate for a delay in start of generating rotational power in the other direction from the drive source.

In addition to the configuration described in the thirteenth aspect, an eighteenth aspect is characterized in that:

the vehicle is a wheeled vehicle (for example, a wheeled vehicle 3 in embodiment);

the driven portion is a first drive wheel (for example, a rear wheel Wr in embodiment) that is either of a front wheel and a rear wheel of wheels of the wheeled vehicle;

the wheeled vehicle includes another drive source (for example, an internal combustion engine 4, a motor 5 in embodiment), which is configured to drive a second drive wheel (for example, a front wheel Wf in embodiment) that is the other of the front wheel and the rear wheel; and when the generation number of times is equal to or greater than the predetermined number of times with the another drive source generating rotational power in the other direction, the connection/disconnection unit controller releases the connection/disconnection unit.

In addition to the configuration described in any one of the thirteenth to eighteenth aspects, a nineteenth aspect is characterized in that the driving system includes a drive source controller (e.g., the controller 8 in embodiment), which controls rotational power generated by the drive source, wherein the drive source controller controls so that rotational power in the other direction is generated from the drive source when the connection/disconnection unit controller releases the connection/disconnection unit.

In addition to the configuration described in the nineteenth aspect, a twentieth aspect is characterized in that:

the engaging element of the unidirectional power transmitting unit is interposed so that an inclined angle increases as the rotational power in the one direction of the drive source increases; and the drive source controller determines a generation amount (for example, a generating time, a generating rate in embodiment) of rotational power in the other direction based on a maximal inclined angle of the engaging element that is obtained based on a maximal generated rotational power in the one direction that is generated by the drive source.

Advantage of the Invention

According to the first aspect, the eccentricity of the unidirectional power transmitting unit can be acquired.

According to the second aspect, the eccentricity of the unidirectional power transmitting unit can be acquired in the sate where the connection/disconnection unit is connected in parallel.

According to the third aspect, an unnecessary release of the connection/disconnection unit can be restricted by releasing the connection/disconnection unit after the eccentricity is acquired.

According to the fourth aspect, even though the connection/disconnection unit is released while the motor is generating the rotational power in the one direction, the unidirectional power transmitting unit does not rotate, and the eccentricity is not eliminated. Therefore, an unnecessary release of the connection/disconnection unit can be restricted by waiting to release the connection/disconnection unit until the rotational power in the one direction of the drive source reaches the vicinity of zero.

According to the fifth aspect, when the direction of the rotational power of the drive source switches from the one direction to the other direction, the release of the connection/disconnection unit is inserted in an interrupting fashion before the start of generation of rotational power in the other direction, whereby the connection/disconnection unit can be lubricated appropriately only by changing the timing at which the generation of torque is started without changing the torque indication value itself.

According to the sixth aspect, the rotational power in the other direction, that is, the braking rotational power can also be generated by other components (wheel brakes) than the drive source, and therefore, the braking force required by the whole of the wheeled vehicle can be satisfied.

According to the seventh aspect, the eccentricity of the unidirectional power transmitting unit can be eliminated. In addition, in the event of the second drive wheel being driven by the another drive source, even though the wheeled vehicle cannot be driven by the first drive wheel as a result of releasing the connection/disconnection unit on the power transmission path on the first drive wheel side, the driving force required by the whole of the wheeled vehicle can be maintained by the use of the driving force of the second drive wheel.

According to the eighth aspect, the eccentricity can be eliminated early by generating the rotational power in the other direction which disengages the unidirectional power transmitting unit, compared with a case where only the connection/disconnection unit is released.

According to the ninth aspect, the rotational drive in the other direction of the drive source can be suppressed to the minimum level by determining the generation amount of the rotational power in the other direction of the drive source to eliminate the eccentricity based on the maximal inclined angle of the engaging element.

According to the tenth aspect, the unidirectional power transmitting unit and the connection/disconnection unit are provided in parallel to each other, and the eccentricity of the unidirectional power transmitting unit can be estimated more accurately which is generated in making the unidirectional power transmitting unit function with the connection/disconnection unit being applied, whereby it is possible to execute an appropriate release of the connection/disconnection unit depending on the eccentricity.

According to the eleventh aspect, the accuracy with which the eccentricity is estimated can be enhanced.

According to the twelfth aspect, by controlling the release of the connection/disconnection unit based on the number of times of generation of the rotational power in the one direction of the motor which is equal to or greater than the predetermined number of times of generation while the unidirectional power transmitting unit and the connection/disconnection unit are operating in parallel with each other, not only can a torque transfer as a basic function of the unidirectional power transmitting unit and the connection/disconnection unit be executed, but also the unidirectional power transmitting unit and the connection/disconnection unit can be protected appropriately.

According to the thirteenth aspect, an excessive control can be restricted.

According to the fourteenth aspect, the accuracy with which the eccentricity is estimated can be enhanced.

According to the fifteenth aspect, even though the connection/disconnection unit is released while the motor is generating the rotational power in the one direction, the unidirectional power transmitting unit does not rotate, and the eccentricity is not eliminated. Therefore, an unnecessary release of the connection/disconnection unit can be restricted by waiting to release the connection/disconnection unit until the rotational power in the one direction of the drive source reaches the vicinity of zero.

According to the sixteenth aspect, when the direction of the rotational power of the drive source switches from the one direction to the other direction, the release of the connection/disconnection unit is inserted in an interrupting fashion before the start of generation of rotational power in the other direction, whereby the missing of rotational power in the one direction can be prevented.

According to the seventeenth aspect, the rotational power in the other direction, that is, the braking rotational power can also be generated by other components (wheel brakes) than the drive source, and therefore, the braking force required by the whole of the wheeled vehicle can be satisfied.

According to the eighteenth aspect, in the case of the second drive wheel being driven by the another drive source, even though the wheeled vehicle cannot be driven by the first drive wheel as a result of releasing the connection/disconnection unit on the power transmission path on the first drive wheel side, the driving force required by the whole of the wheeled vehicle can be maintained by increasing the driving force of the second drive wheel.

According to the nineteenth aspect, the eccentricity can be eliminated early by generating the rotational power in the other direction which disengages the unidirectional power transmitting unit, compared with a case where only the connection/disconnection unit is released.

According to the twentieth aspect, the rotational drive in the other direction of the drive source can be suppressed to the minimum level by determining the generation amount of rotational power in the other direction of the drive source to eliminate the eccentricity based on the maximal inclined angle of the engaging element.

BRIEF DESCRIPTION OF DRAWINGS

FIG. 4 is a table depicting relationships between a front wheel driving system and the rear wheel driving system in various states of the wheeled vehicle together with operating states of motors.

MODE FOR CARRYING OUT THE INVENTION

Firstly, an embodiment of a driving system according to the invention will be described based on FIGS. 1 to 3. The driving system can be used for vehicles such as wheeled vehicles, aircraft and vessels. However, in the following embodiment, the driving system will be described as being applied to a wheeled vehicle.

Figure 1:
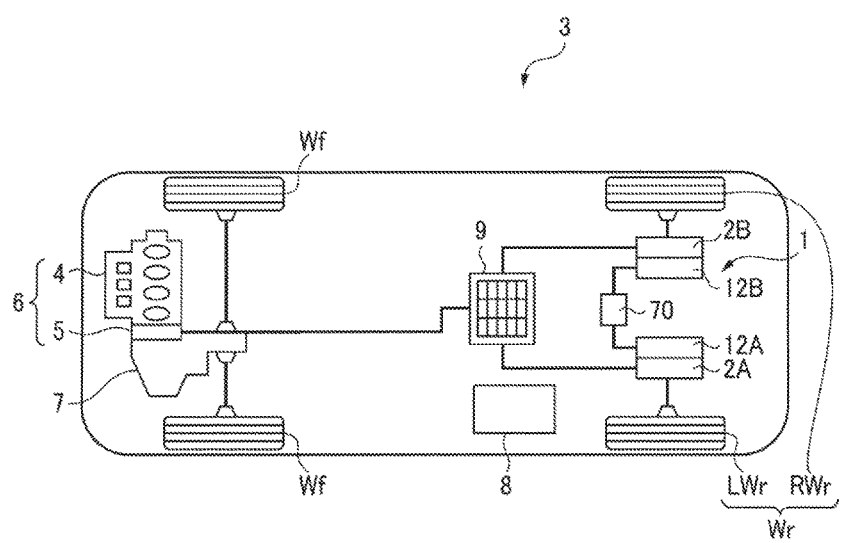
FIG. 1 is a block diagram showing a schematic configuration of a hybrid vehicle that is an embodiment of a wheeled vehicle on which a driving system according to the invention can be mounted.

A vehicle driving system according to this embodiment employs motors as drive sources to drive axle shafts and is employed on a wheeled vehicle having a driving system as shown in FIG. 1. In the following description, the vehicle driving system will be described as being used to drive rear wheels. However, the vehicle driving system may be used to drive front wheels.

A wheeled vehicle 3 shown in FIG. 1 is a hybrid wheeled vehicle having a driving system 6 (hereinafter, referred to as a "front wheel driving system") in which an internal combustion engine 4 and a motor 5 are connected in series at a front portion of the wheeled vehicle. Power of this front driving system 6 is transmitted to front wheels Wf by way of a transmission 7, while power of a driving system 1 (hereinafter, referred to as a "rear wheel driving system") which is provided separately from the front wheel driving system 6 at a rear portion of the wheeled vehicle is transmitted to rear wheels Wr (RWr, LWr). The motor 5 of the front wheel driving system 6 and a first and second motors 2A. 2B of the rear wheel driving system 1 on the rear wheels Wr side are connected to a battery 9, so that electric power can be supplied to the motors from the battery 9, while energies generated at the driving systems can be recovered at the battery 9 for regeneration. Reference numeral 8 denotes a controller configured to perform various controls for the whole of the wheeled vehicle.

Figure 2:
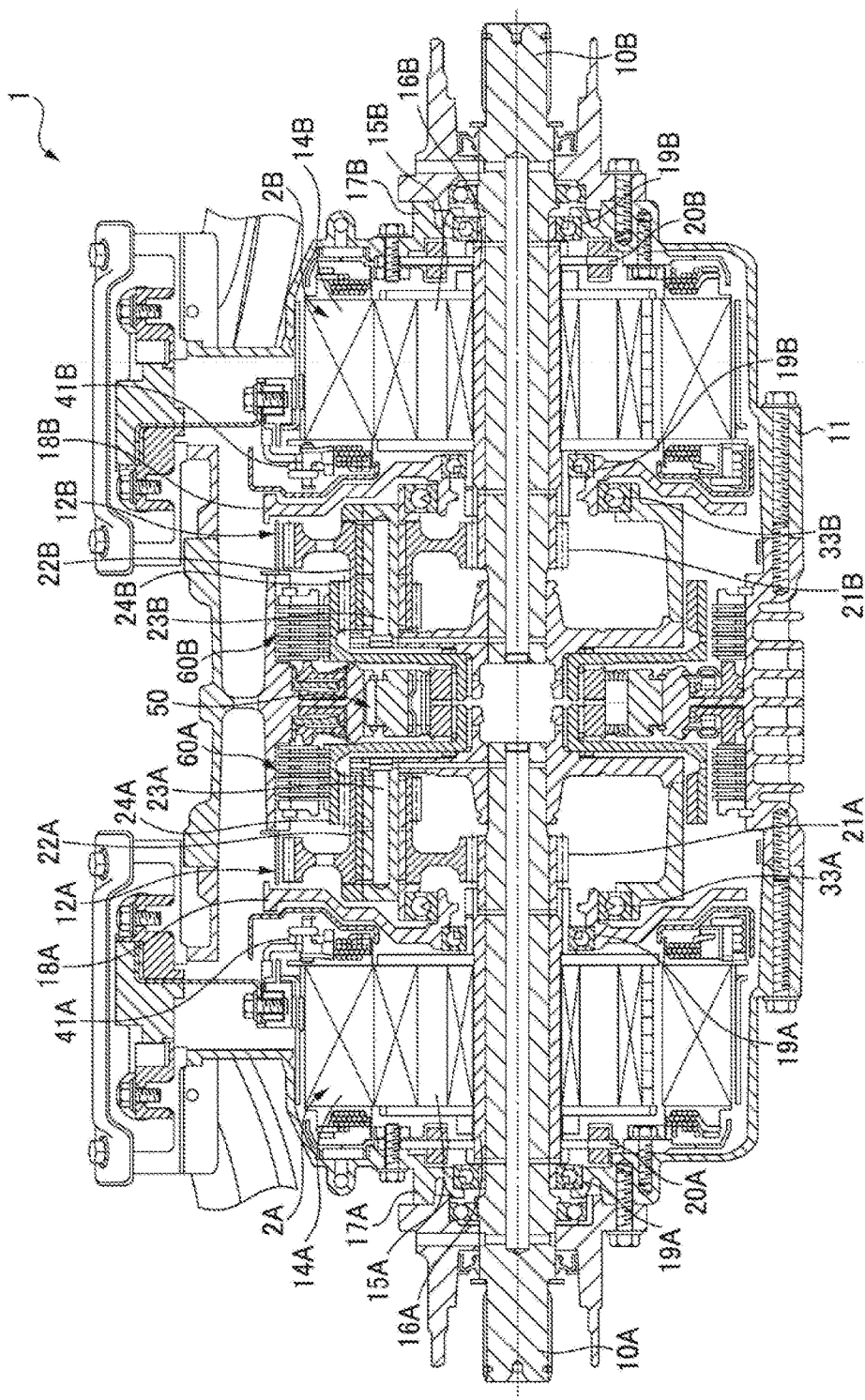
FIG. 2 is a vertical longitudinal sectional view of an embodiment of a rear wheel driving system.
Figure 3:
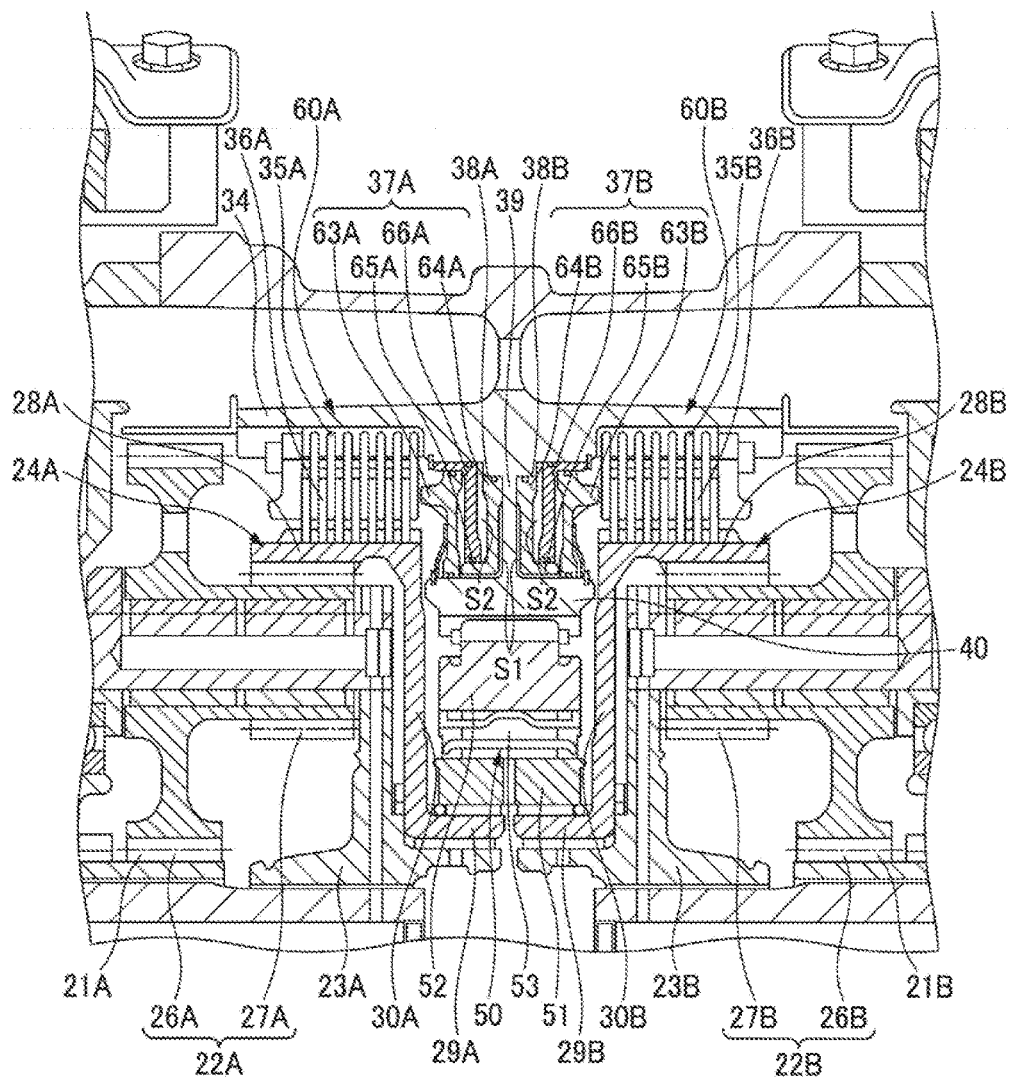
FIG. 3 is a partial enlarged sectional view of the rear wheel driving system shown in FIG. 2.

FIG. 2 shows a vertical longitudinal cross-sectional view of the whole of the rear wheel driving system 1. In FIG. 2, reference numerals 10A, 10B denote left and right axle shafts of the rear wheels Wr of the wheeled vehicle 3, which are disposed so as to extend coaxially in a width direction of the wheeled vehicle 3. A speed reducer case 11 of the rear wheel driving system 1 has a substantially cylindrical shape as a whole. The first and second motors 2A, 2B configured to drive the axle shafts and a first and second planetary gear type speed reducers 12A, 12B configured to decelerate the driving rotation of the first and second motors 2A, 2B are disposed coaxially with the axle shafts 10A, 10B in an interior of the speed reducer case 11. The first motor 2A and the first planetary gear type speed reducer 12A function as a left wheel driving system that drives the left rear wheel LWr. The second motor 2B and the second planetary gear type speed reducer 12B function as a right wheel driving system that drives the right rear wheel RWr. The first motor 2A and the first planetary gear type speed reducer 12A are disposed laterally symmetrical with the second motor 2B and the second planetary gear type speed reducer 12B in the wheeled vehicle's width direction within the speed reducer case 11.

Respective stators 14A, 14B of the first and second motors 2A. 2B are fixed in place inboards of left and right end sides of the speed reducer case 11, and annular rotors 15A, 15B are disposed, respectively, on inner circumferential sides of the stators 14A, 14B so as to rotate relatively to the corresponding stators 14A, 14B. Cylindrical shafts 16A, 16B, which surround outer circumferences of the axle shafts 10A, 10B, are connected to inner circumferential portions of the rotors 15A, 15B, respectively, and the cylindrical shafts 16A, 16B are supported in end walls 17A, 17B and middle walls 18A, 18B of the speed reducer case 11 via bearings 19A, 19B so as to rotate relative to the axle shafts 10A and 10B coaxially. Additionally, resolvers 20A. 20B, which are configured to feed back information on rotational positions of the rotors 15A, 15B to a controller (not shown) which controls the first and second motors 2A, 2B, are provided respectively, on outer circumferences of opposite end sides of the cylindrical shafts 16A, 16B on the end walls 17A, 17B of the speed reducer case 11.

The first and second planetary gear type speed reducers 12A, 12B include sun gears 21A, 21B, ring gears 24A. 24B which are situated on outer circumferential sides of the sun gears 21A, 21B, pluralities of planetary gears 22A, 22B which mesh with the sun gears 21A, 21B and the ring gears 24A, 24B, and planetary carriers 23A, 23B which support the planetary gears 22A, 22B respectively. The torque of the first and second motors 2A, 2B is inputted from the sun gears 21A, 21B, and the torque which is decelerated is outputted by way of the planetary carriers 23A, 23B.

The sun gears 21A, 21B are formed integrally on the cylindrical shafts 16A, 16B, respectively. As shown in FIG. 3, for example, the planetary gears 22A, 22B are double pinions having first pinions 26A, 26B which are greater in diameter and which mesh directly with the sun gears 21A, 21B and second pinions 27A, 27B which are smaller in diameter than the first pinions 26A, 26B. The first pinions 26A, 26B and the second pinions 27A, 27B are formed integrally so as not only to be concentric but also to be offset in an axial direction. The planetary gears 22A, 22B are supported on the planetary carriers 23A, 23B, respectively. The planetary carriers 23A, 23B extend radially inwards at axial inner end portions thereof and are spline fitted on the axle shafts 10A, 10B, respectively, so as to be supported thereon, whereby the planetary carriers 23A, 23B are supported on the axle shafts 10A, 10B so as to rotate together. The planetary carriers 23A, 23B are also supported in the middle walls 18A, 18B via bearings 33A, 33B.

The middle walls 18A, 18B separate motor accommodation spaces where the first and second motors 2A, 2B are accommodated individually from speed reducer accommodation spaces where the first and second planetary gear type speed reducers 12A, 12B are accommodated. The middle walls 18A, 18B are formed to be bent or curved so that an axial space defined therebetween expands from a radially outer side towards a radially inner side. Bearings 33A, 33B, which support the planetary carriers 23A, 23B, respectively, are disposed on radially inner sides and sides facing the first and second planetary gear type speed reducers 12A, 12B of the middle walls 18A, 18B. Additionally, bus rings 41A. 41B for the stators 14A, 14B are disposed on radially outer sides and sides facing the first and second electric motors 2A, 2B of the middle walls 18A, 18B.

The ring gears 24A, 24B include gear portions 28A, 28B which mesh with the second pinion gears 27A, 27B, which are smaller in diameter, on inner circumferential surfaces thereof, small diameter portions 29A, 29B which are smaller in diameter than the gear portions 28A, 28B and which are disposed so as to face each other in a middle position of the speed reducer case 11, and connecting portions 30A, 30B which connect axial inner end portions of the gear portions 28A, 28B and axial outer end portions of the small diameter portions 29A, 29B together in a radial direction. In this embodiment, a maximal diameter of the ring gears 24A, 24B is set so as to be smaller than a maximal distance of the first pinions 26A, 26B from centers of the axle shafts 10A, 10B. The small diameter portions 29A, 29B spline fit in an inner race 51 of a one-way clutch 50, which will be described later, and the ring gears 24A, 24B rotate together with the inner race 51 of the one-way clutch 50.

Incidentally, a cylindrical space is secured between the speed reducer case 11 and the ring gears 24A, 24B, and hydraulic brakes 60A, 60B, which constitutes brake units for the ring gears 24A, 24B, are disposed in the space so as to overlap the first pinions 26A, 26B in the radial direction and to overlap the second pinions 27A, 27B in the axial direction. In the hydraulic brakes 60A, 60B, a plurality of fixed plates 35A, 35B are spline fitted in an inner circumferential surface of a cylindrical radially outer support portion 34 which extend in the axial direction on a radially inner side of the speed reducer case 11, and a plurality of rotational plates 36A, 36B are spline fitted on outer circumferential surfaces of the ring gears 24A. 24B. Then, the fixed plates 35A, 35B and the rotational plates 36A, 36B are disposed alternately in the axial direction, respectively, and these plates 35A, 35B, 36A, 36B are operated so as to be engaged with and disengaged from each other by annular pistons 37A, 37B. The pistons 37A, 37B are accommodated so as to reciprocate back and forth freely in annular cylinder chambers 38A, 38B, respectively, which are defined between a laterally separating wall 39 which extends radially inwards from a middle position of the speed reducer case 11 and the radially outer support portion 34 and a radially inner support portion 40 which are connected together by the laterally separating wall 39. The pistons 37A, 37B are caused to move forwards or advance by inducing highly pressurised oil into the cylinder chambers 38A, 38B and to move backwards or retreat by discharging the oil from the cylinder chambers 38A, 38B. The hydraulic brakes 60A. 60B are connected to an electric oil pump 70 (refer to FIG. 1).

To describe in more detail, the pistons 37A, 37B have first piston walls 63A, 63B and second piston walls 64A, 64B which are disposed forwards and backwards in the axial direction, and these piston walls 63A, 63B, 64A, 64B are connected by cylindrical inner circumferential walls 65A, 65B. Consequently, an annular space which opens radially outwards is defined between the first piston walls 63A, 63B and the second piston walls 64A. 64B, and this annular space is partitioned laterally in the axial direction by partition members 66A, 66B which are fixed to inner circumferential surfaces of outer walls of the cylinder chambers 38A, 38B, respectively. Spaces defined between the laterally separating wall 39 of the speed reducer case 11 and the second piston walls 64A, 64B are made into first operation chambers S1 into which highly pressurised oil is induced directly, and spaces defined between the partition members 66A, 66B and the first piston walls 63A. 63B are made into second operation chambers S2 which communicate with the first operation chambers S1 through holes formed in the inner circumferential walls 65A, 65B. Spaces defined between the second piston walls 64A, 64B and the partition members 66A, 66B communicate with the atmospheric pressure.

In the hydraulic brakes 60A, 60B, oil is introduced into the first operation chambers S and the second operation chambers S2 from a hydraulic circuit, not shown, whereby the fixed plates 35A, 35B and the rotational plates 36A, 36B are pressed against each other by means of the hydraulic pressure of the oil applied to the first piston walls 63A. 63B and the second piston walls 64A, 64B. Consequently, a large pressure receiving area can be obtained by the first and second piston walls 63A, 63B, 64A, 64B which are arranged laterally in the axial direction. Therefore, a great pressing force against the fixed plates 35A, 35B and the rotational plates 36A 36B can be obtained while restricting radial areas of the pistons 37A, 37B from being increased.

In the hydraulic brakes 60A. 60B, the fixed plates 35A, 35B are supported on the radially outer support portion 34 which extend from the speed reducer case 11, while the rotational plates 36A, 36B are supported on the ring gears 24A, 24B. Thus, when both the plates 35A, 35B, 36A, 36B are pressed by the pistons 37A. 37B, braking force is applied to the ring gears 24A, 24B as a result of frictional engagements made between both the plates 35A, 35B and 36A, 36B, whereby the ring gears 24A, 24B are fixed (locked). Then, when the engagement of both the plates 35A, 35B and 36A, 36B by the pistons 37A, 37B is released, the ring gears 24A, 24B are permitted to rotate freely.

A space portion is also defined between the connecting portions 30A. 30B of the ring gears 24A, 24B which face each other in the axial direction. The one-way clutch 50 is disposed within the space portion, the one-way clutch 50 being configured to transmit power to the ring gears 24A, 24B only in one direction and to cut off power acting in the other direction. The one-way clutch 50 includes a large number of sprags 53 which are interposed between the inner race 51 and an outer race 52 which has the same rotational axis, and the inner race 51 rotate together with the small diameter portions 29A, 29B of the ring gears 24A, 24B through spline fitting. In addition, the outer race 52 is positioned and is prevented from rotating by the radially inner support portion 40. The one-way clutch 50 is engaged to lock the rotation of the ring gears 24A, 24B when the wheeled vehicle 3 travels forwards by means of the power of the first and second motors 2A, 2B of the wheeled vehicle 3. To describe this in greater detail, the one-way clutch 50 is engaged when the torque of the first and second motors 2A, 2B side in a forward direction (a rotational direction when the wheeled vehicle 3 is caused to travel forwards) is inputted into the rear wheels Wr side, while the one-way clutch 50 is disengaged when the torque of the first and second motors 2A. 2B side in a reverse direction is inputted into the rear wheels Wr side. The one-way clutch 50 is disengaged when the torque of the rear wheels Wr side in the forward direction is inputted into the first and second motors 2A, 2B side, while the one-way clutch 50 is engaged when the rotational power of the wheels Wr side in the reverse direction is inputted into the first and second motors 2A, 2B side. In other words, when disengaged, the one-way clutch 50 permits the rotation of the ring gears 24A, 24B in one direction by means of the torque of the first and second motors 2A, 2B in a reverse direction, and when engaged, the one-way clutch 50 restricts the rotation of the ring gears 24A, 24B in a reverse direction by means of the torque of the first and second motors 2A, 2B in a forward direction. The reverse torque means torque in a direction which increases the reverse rotation, and torque in a direction which decreases the forward rotation. By increasing the reverse torque of the ring gears 24A, 24B which are connected to the inner race 51 (the forward torque of the first and second motors 2A, 2B), an inclined angle of the sprags 53 is increased, in response to which the torque transmission capacity of the one-way clutch 50 is increased. On the other hand, by decreasing the reverse torque of the ring gears 24A, 24B, the inclined angle of the sprags 53 is decreased, in response to which the torque transmission capacity of the one-way clutch 50 is decreased, and then, the one-way clutch 50 is disengaged.

In the rear wheel driving system 1 of this embodiment which is configured as has been described heretofore, the one-way clutch 50 and the hydraulic brakes 60A, 60B are disposed in parallel on a power transmission path between the first and second motors 2A, 2B and the rear wheels Wr. It is noted that the two hydraulic brakes 60A, 60B do not necessarily have to be provided, and hence, one hydraulic brake is provided in one of the spaces, and the other space may be used as a breather chamber.

Here, the controller 8 (refer to FIG. 1) is a controller which controls various controls of the whole of the wheeled vehicle, and wheel speed sensor values, motor rotation speed sensor values of the first and second motors 2A, 2B, steering wheel angle, accelerator pedal position AP, shift position, state of charge (SOC) at the battery 9, oil temperature and the like are inputted into the controller 8. On the other hand, a signal to control the internal combustion engine 4, signals to control the first and second motors 2A, 2B, a control signal to control the electric oil pump 70 and the like are outputted from the controller 8.

Namely, the controller 8 includes at least a function as a motor controller to control the first and second motors 2A, 2B and a function as a connection/disconnection unit controller to control the application and release of the hydraulic brakes 60A, 60B as a connection/disconnection unit.

FIG. 4 is a table depicting relationships between the front wheel driving system 6 and the rear wheel driving system 1 in a variety of wheeled vehicle states together with operating states of the first and second motors 2A, 2B. In the figure, a front unit represents the front wheel driving system 6, a rear unit represents the rear wheel driving system 1, a rear motor represents the first and second motors 2A, 2B, OWC represents the one-way clutch 50, and BRK represents the hydraulic brakes 60A, 60B. Additionally, FIGS. 5 to 10 show speed collinear diagrams in various states of the rear wheel driving system 1. LMOT represents the first motor 2A, RMOT represents the second motor 2B, S and C on the left-hand side represent the sun gear 21A of the first planetary gear type speed reducer 12A connected to the first motor 2A and the planetary carrier 23A of the first planetary gear type speed reducer 12A, respectively, S and C on the right-hand side represent the sun gear 21B of the second planetary gear type speed reducer 12B and the planetary carrier 23B of the second planetary gear type speed reducer 12B, respectively, R represents the ring gears 24A, 24B of the first and second planetary gear type speed reducers 12A, 12B, BRK represents the hydraulic brakes 60A, 60B, and OWC represents the one-way clutch 50. In the following description, the rotational directions of the sun gears 21A. 21B which are rotated by the first and second motors 2A, 2B when the wheeled vehicle travels forwards will be referred to as a forward direction. Additionally, in the figures, upward motions of the sun gears and the planetary carriers from a state where the wheeled vehicle is at a halt represent forward rotations of the motors, downward motions of the sun gears and the planetary carriers from the halt state represent reverse rotations of the motors, upward arrows represent forward torque, and downward arrows represent reverse torque.

Figure 5:
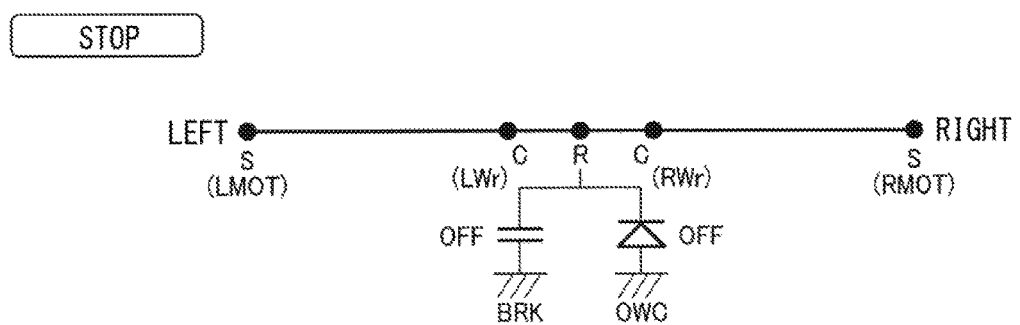
FIG. 5 is a speed collinear diagram of the rear wheel driving system while the wheeled vehicle is at a halt.

When the wheeled vehicle is at a halt, both the front wheel driving system 6 and the rear wheel driving system 1 are not driven. Consequently, as shown in FIG. 5, the first and second motors 2A, 2B of the rear wheel driving system 1 are not in operation, and hence, the axle shafts 10A, 10B are also not in operation. Therefore, no torque acts on any of the constituent elements. In this state, the hydraulic brakes 60A, 60B are released (OFF). Additionally, the one-way clutch 50 is not engaged (OFF) because the first and second motors 2A, 2B are not driven.

Figure 6:
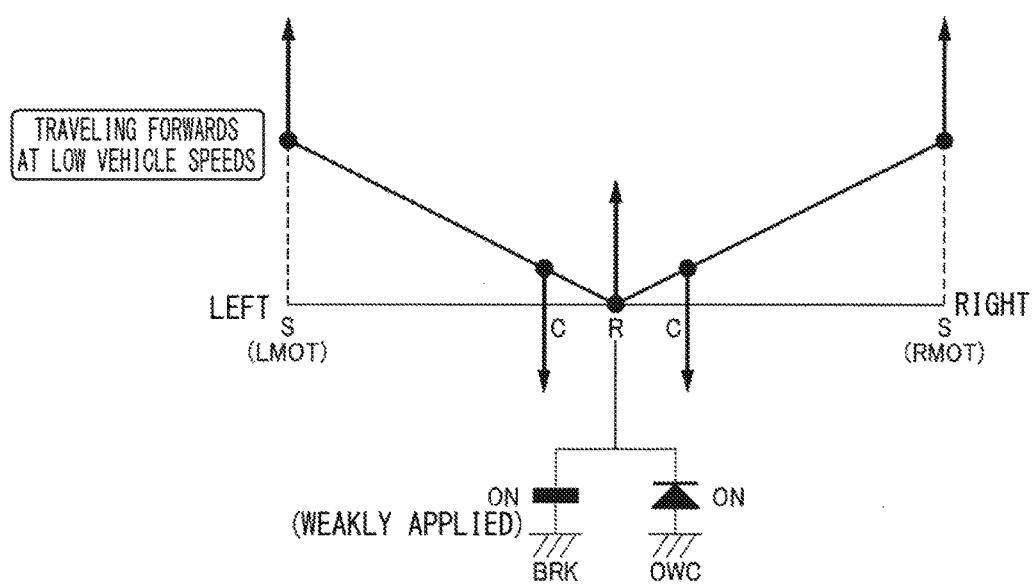
FIG. 6 is a speed collinear diagram of the rear wheel driving system while the wheeled vehicle is travelling forwards at low vehicle speeds.

Then, when the wheeled vehicle travels forwards at low vehicle speeds with good motor efficiency as in an EV start or an EV cruise after a key position is turned to an ON position, a rear wheel drive is performed by the rear wheel driving system 1. As shown in FIG. 6, when a power running drive is performed so that the first and second motors 2A, 2B rotate in the forward direction, forward torque is applied to the sun gears 21A, 21B. At this time, the one-way clutch 50 is engaged and the ring gears 24A, 24B are locked, as has been described above. This causes the planetary carriers 23A, 23B to rotate in the forward direction, whereby the wheeled vehicle is caused to travel forwards. In addition, a travel resistance is acting on the planetary carriers 23A. 23B in the reverse direction from the axle shafts 10A, 10B. When the wheeled vehicle 3 starts traveling forwards in this way, the key position is turned to the ON position and the torque of the first and second motors 2A, 2B is increased, whereby the one-way clutch 50 is engaged mechanically, and the ring gears 24A, 24B are locked.

At this time, the hydraulic brakes 60A, 60B are controlled to be weakly applied. The weakly applied state means a state in which although power can be transmitted, the hydraulic brakes 60A, 60B are applied with an application force which is weaker than an application force with which the hydraulic brakes 60A, 60B are applied normally. The one-way clutch 50 is engaged when the forward torque of the first and second motors 2A, 2B is inputted into the rear wheels side Wr, and the power can be transmitted only by the one-way clutch 50. However, the hydraulic brakes 60A, 60B which are provided parallel to the one-way clutch 50 are also applied weakly to connect the first and second motors 2A, 2B side and the rear wheels Wr side with each other, whereby it is possible to restrict the occurrence of a risk of no power being transmitted between the first and second motors 2A, 2B side and the rear wheels Wr side even though the one-way clutch 50 is disengaged as a result of the forward torque inputted from the first and second motors 2A, 2B being reduced temporarily. In addition, it is not necessary to perform a rotation speed control which would otherwise be necessary to connect the first and second motors 2A, 2B side and the rear wheels Wr side with each other when the driving of the wheeled vehicle is shifted to a regenerative deceleration, which will be described later. The energy to be consumed to apply the hydraulic brakes 60A, 60B is reduced by making an application force of the hydraulic brakes 60A, 60B with the one-way clutch 50 engaged weaker than an application force of the hydraulic brakes 60A, 60B with the one-way clutch 50 disengaged.

Figure 7:
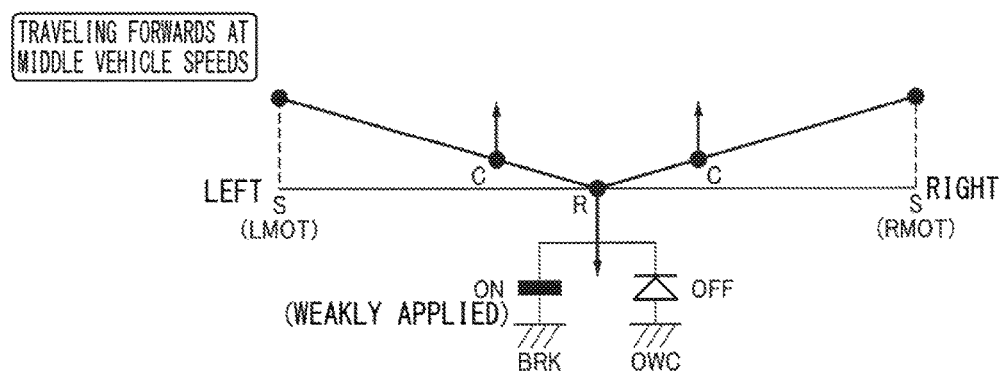
FIG. 7 is a speed collinear diagram of the rear wheel driving system while the wheeled vehicle is travelling forwards at middle vehicle speeds.

When the vehicle speed is increased from the forward traveling at low vehicle speeds to a forward traveling at middle vehicle speeds with good engine efficiency, the driving of the wheeled vehicle is shifted from the rear wheel driving by the rear wheel driving system 1 to the front wheel driving by the front wheel driving system 6. As shown in FIG. 7, when the power running drive by the first and second motors 2A, 2B is stopped, the forward torque attempting to drive the wheeled vehicle forwards is applied to the planetary carriers 23A, 23B from the axle shafts 10A, 10B. Therefore, as has been described above, the one-way clutch 50 is disengaged. At this time, too, the hydraulic brakes 60A, 60B are controlled to be applied weakly.

Figure 8:
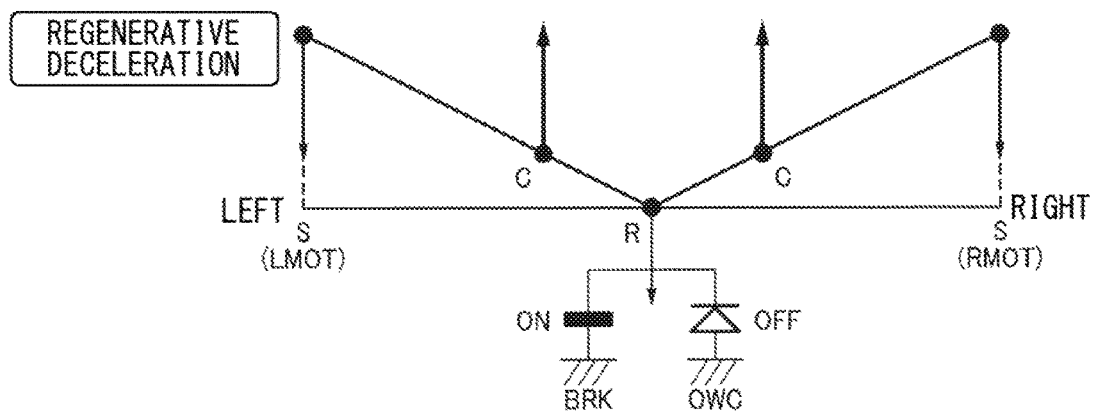
FIG. 8 is a speed collinear diagram of the rear wheel driving system while the wheeled vehicle is being decelerated for regeneration.

When the first and second motors 2A, 2B are attempted to be driven for regeneration from the state shown in FIG. 6 or 7, as shown in FIG. 8, the forward torque attempting to keep the wheeled vehicle traveling forwards is applied to the planetary carriers 23A, 23B from the axle shafts 10A. 10B, and therefore, the one-way clutch 50 is disengaged as has been described above. At this time, the hydraulic brakes 60A, 60B are controlled to be applied (ON). Consequently, the ring gears 24A. 24B are locked, and reverse regenerative braking torque is applied on the first and second motors 2A, 2B, whereby a regenerative deceleration is executed at the first and second motors 2A, 2B. In this way, when the forward torque of the rear wheels Wr side is inputted into the first and second motors 2A, 2B, the one-way clutch 50 is disengaged, whereby the power cannot be transmitted only by the one-way clutch 50. However, the power can still be transmitted by causing the hydraulic brakes 60A. 60B which are provided in parallel to the one-way clutch 50 to be applied to connect the first and second motors 2A, 2B side and the rear wheels Wr side with each other. Then, the energy of the wheeled vehicle 3 can be recovered for regeneration by controlling the first and second motors 2A. 2B to be driven for regeneration.

Following this, when the wheeled vehicle is accelerated, a four-wheel driving is executed which involves both the front wheel driving system 6 and the rear wheel driving system 1, and the rear wheel driving system 1 becomes the same sate as that of the forward traveling at low vehicle speeds as shown in FIG. 6.

When the wheeled vehicle 3 is traveling forwards at high vehicle speeds, the front wheel driving is executed by the front wheel driving system 6, in which case the first and second motors 2A, 2B are stopped and the hydraulic brakes 60A, 60B are controlled to be released. The one-way clutch 50 is disengaged because the forward torque at the rear wheels Wr side is inputted into the first and second motors 2A, 2B, and the ring gears 24A, 24B start to rotate by controlling the hydraulic brakes 60A, 60B to be released.

Figure 9:
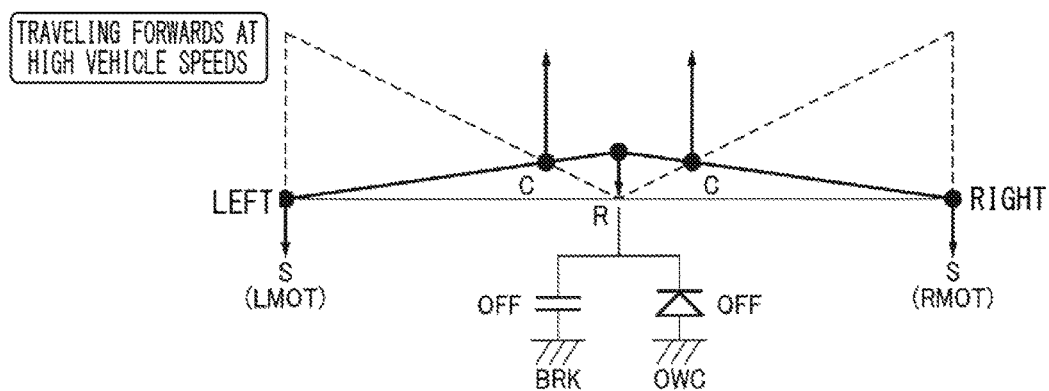
FIG. 9 is a speed collinear diagram of the rear wheel driving system while the wheeled vehicle is travelling forwards at high vehicle speeds.

As shown in FIG. 9, when the first and second motors 2A, 2B stop the power running drive, the forward torque attempting to cause the wheeled vehicle to travel forwards acts on the planetary carriers 23A, 23B from the axle shafts 10A, 10B. Therefore, as has been described above, the one-way clutch 50 is disengaged. At this time, the rotation losses at the sun gears 21A, 21B and the first and second motors 2A, 2B are inputted into the sun gears 21A, 21B as a resistance, and rotation loses of the ring gears 24A, 24B are generated at the ring gears 24A, 24B.

The ring gears 24A, 24B are permitted to rotate freely by controlling the hydraulic brakes 60A, 60B to be released, whereby the connection of the first and second motors 2A, 2B and the rear wheels Wr side is cut off, whereby the power cannot be transmitted therebetween. Consequently, the forced associated rotation of the first and second motors 2A, 2B is prevented, whereby the over revolution of the first and second motors 2A, 2B is prevented when the wheeled vehicle 3 is driven at high vehicle speeds by the front wheel driving system 6.

Figure 10:
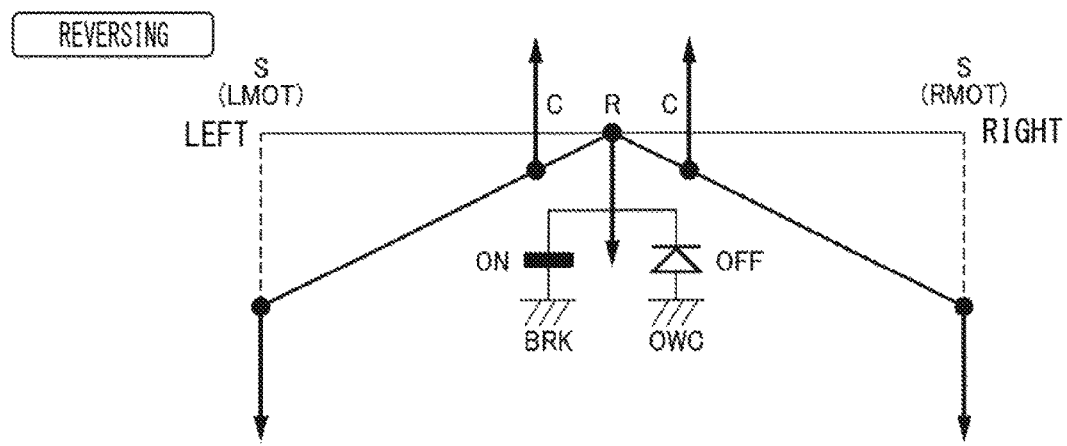
FIG. 10 is a speed collinear diagram of the rear wheel driving system while the wheeled vehicle is being reversed.

When the wheeled vehicle is reversed, as shown in FIG. 10, the first and second motors 2A, 2B are driven through reverse power running, torque in the reverse direction is applied to the sun gears 21A, 21B. At this time, as has been described above, the one-way clutch 50 is disengaged.

At this time, the hydraulic brakes 60A, 60B are controlled to be applied. Consequently, the ring gears 24A, 24B are locked, and the planetary carriers 23A, 23B are rotated in the reverse direction, whereby the wheeled vehicle is driven reversely. In this case, a travel resistance is acting on the planetary carriers 23A, 23B in the forward direction from the axle shafts 10A, 10B. In this way, when the reverse torque of the first and second motors 2A, 2B is inputted into the rear wheels Wr side, the one-way clutch 50 is disengaged, whereby the power cannot be transmitted only by the one-way clutch 50. However, the power can still be transmitted by causing the hydraulic brakes 60A, 60B which are provided in parallel to the one-way clutch 50 to be applied to connect the first and second motors 2A. 2B side with the rear wheels Wr side. Then, the wheeled vehicle 3 can be reversed by the torque of the first and second motors 2A, 2B.

In this way, in the rear wheel driving system 1, the hydraulic brakes 60A, 60B are controlled to be applied or released depending on the traveling states of the wheeled vehicle, in other words, whether the first and second motors 2A, 2B rotate in the forward direction or the reverse direction and whether the power is inputted from the first and second motors 2A, 2B side or the rear wheels Wr side, and the application force is adjusted even when the hydraulic brakes 60A, 60B are being applied.

Figure 11:
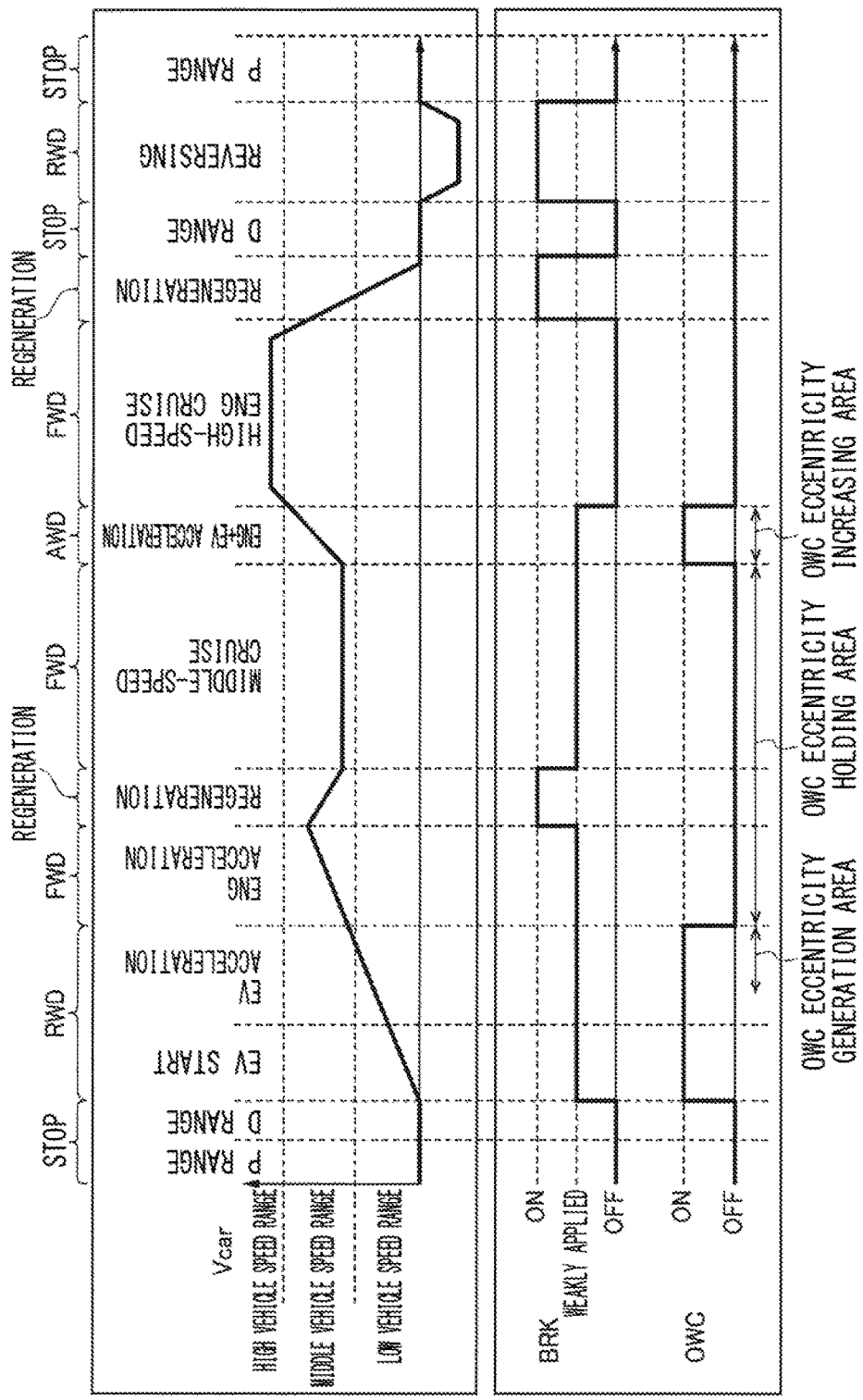
FIG. 11 is a timing chart of an example of driving of the wheeled vehicle.

FIG. 11 is a timing chart of the electric oil pump 70 (EOP), the one way clutch 50 (OWC) and the hydraulic brakes 60A, 60B (BRK) when the wheeled vehicle performs a series of actions of EV start from stop→EV acceleration→ENG acceleration→regenerative deceleration→middle-speed ENG cruise→ENG+EV acceleration→high-speed ENG cruise→regenerative deceleration→stop→reversing→stop.

Firstly, the one-way clutch 50 is kept disengaged (OFF) and the hydraulic brakes 60A, 60B are kept released (OFF) until the key position is turned to the ON position, a shift lever is shifted from a P range to a D range, and an accelerator pedal is depressed. When the accelerator pedal is depressed from that state, the EV start, and the EV acceleration through rear wheel driving (RWD) by the rear wheel driving system 1 is performed. At this time, the one-way clutch 50 is engaged (ON), and the hydraulic brakes 60A, 60B are weakly applied. Then, when the driving of the wheeled vehicle is shifted from the rear wheel driving to the front wheel driving as a result of the vehicle speed reaching the middle vehicle speed range from the low vehicle speed range, the vehicle is driven through ENG driving (FWD) by the internal combustion engine 4. At this time, the one-way clutch 50 is disengaged (OFF), and the hydraulic brakes 60A, 60B remain in the same state (the weakly applied state). Then, when the regenerative deceleration is performed on the wheeled vehicle as a result of the brake pedal being depressed, for example, with the one-way clutch 50 remaining disengaged (OFF), the hydraulic brakes 60A, 60B are applied (ON). While the wheeled vehicle is cruising at middle vehicle speeds by the use of the power of the internal combustion engine 4, the same state as the ENG driving described above results. Following this, when the accelerator pedal is depressed further, shifting the driving of the wheeled vehicle from the front wheel driving to the four-wheel driving (AWD), the one-way clutch 50 is engaged (ON) again. Then, when the vehicle speed reaches the high vehicle speed range from the middle vehicle speed range, the wheeled vehicle is ENG driven (FWD) by the internal combustion engine 4 again. At this time, the one-way clutch 50 is disengaged (OFF), and the hydraulic brakes 60A, 60B are released (OFF), whereby the first and second motors 2A, 2B are stopped. Then, when the regenerative deceleration is performed, the same state as the regenerative deceleration described above results. Then, when the wheeled vehicle comes to a halt, the one-way clutch 50 is disengaged (OFF), and the hydraulic brakes 60A, 60B are released (OFF).

Here, the characteristics of the one-way clutch 50 will be described.

Firstly, a situation where the hydraulic brakes 60A, 60B are not provided is assumed to describe the characteristics of the one-way clutch 50 itself. In this case, in the one-way clutch 50, the inclined angle of the sprags 53 change in association with the relative rotational movement between the outer race 52 and the inner race 51, which changes the engaged state of the one-way clutch 50, and the torque transmission capacity of the one-way clutch 50 changes according to the change in the engaged state of the one-way clutch 50.

In the rear wheel driving system 1, the outer race 52 is fixed, and therefore, the inclined angle of the sprags 53 is increased by a reverse rotational movement of the inner race 51 triggered by a torque sum (hereinafter, referred to as a left and right torque sum) in the reverse direction which is applied to the two ring gears 24A, 24B which are connected to the inner race 51, according to which the torque transmission capacity of the one-way clutch 50 is increased. On the other hand, when the reverse left and right torque sum applied to the ring gears 24A, 24B is decreased, the inclined angle of the sprags 53 is decreased, according to which the torque transmission capacity of the one-way clutch 50 is decreased, and then, the one-way clutch 50 is disengaged. In this way, in the event of the one-way clutch 50 being used alone, centers of the inner race 51 and the outer race 52 are automatically controlled because the inclined angle of the sprags 53 becomes uniform along the full circumference of the one-way clutch 50.

Figure 12:
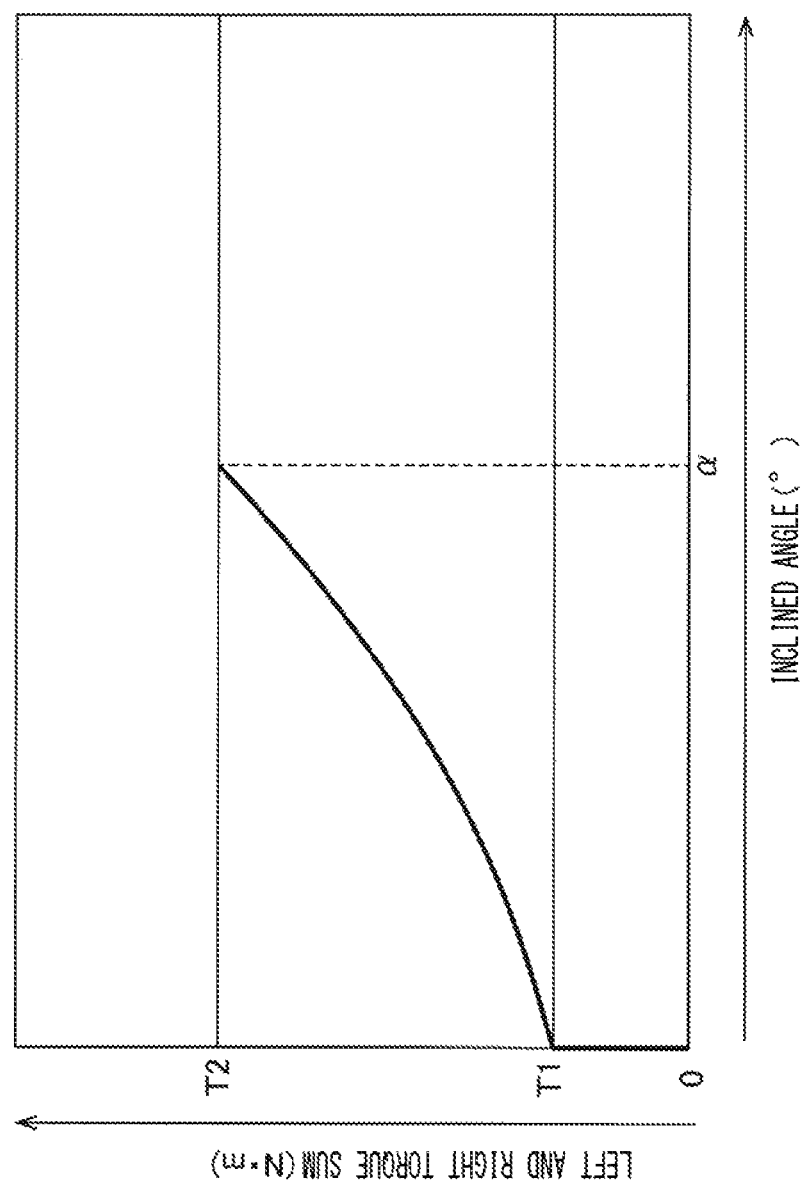
FIG. 12 is a graph showing a relationship between a sum of left and right torque applied to ring gears in a reverse direction and an inclined angle of sprags.

Following this, discarding the assumption that the hydraulic brakes 60A, 60B are not provided, the characteristics of the one-way clutch 50 provided in the rear wheel driving system 1 of this embodiment will be described by reference to FIG. 12. FIG. 12 is a graph showing a relationship between a left and right torque sum applied to the ring gears 24A, 24B in the reverse direction and the inclined angle of the sprags 53. In the figure, reference character T1 denotes a limit transfer torque with the hydraulic brakes 60A, 60B weakly applied (hereinafter, referred to as a weakly applied limit transfer torque), and reference character T2 denotes a maximum value of the reverse left and right torque sum applied to the ring gears 24A, 24B.

As shown in FIGS. 4 and 6, in the rear wheel driving system 1, in the event of a forward left and right torque sum of the first and second motors 2A, 2B being increased, namely, in the event of a reverse left and right torque sum applied to the ring gears 24A, 24B being increased, the one-way clutch 50 is engaged, and with the one-way clutch 50 engaged, the hydraulic brakes 60A, 60B which are provided in parallel to the one-way clutch 50 are weakly applied. In the case where the reverse left and right torque sum applied to the ring gears 24A. 24B is equal to or smaller than the weakly applied limit transfer torque T1 of the hydraulic brakes 60A, 60B, the hydraulic brakes 60A, 60B transmit the reverse left and right torque sum applied to the ring gears 24A, 24B. Consequently, the sprags 53 are almost not inclined (the inclined angle≈0) because the reverse left and right torque sum is not applied to the inner race 51, and the one-way clutch 50 does not contribute to the transmission of the left and right torque sum of the first and second motors 2A, 2B.

In the case where the reverse left and right torque sum applied to the ring gears 24A, 24B exceeds the weakly applied limit transfer torque T1 of the hydraulic brakes 60A. 60B, the hydraulic brakes 60A, 60B transmit the weakly applied limit transfer torque T1, whereby the reverse left and right torque sum is applied to the inner race 51 according to the torque which exceeds the weakly applied limit transfer torque T1, and therefore, the sprags 53 are inclined greatly, and the one-way clutch 50 transmits the amount of torque which exceeds the weakly applied limit transfer torque T1. An inclined angle α of the sprags 53 in a state where the reverse left and right torque sum applied to the ring gears 24A, 24B takes a maximal value T2 becomes a maximal inclined angle of the sprags 53 of the one-way clutch 50 with hydraulic brakes 60A, 60B weakly applied.

Figure 13:
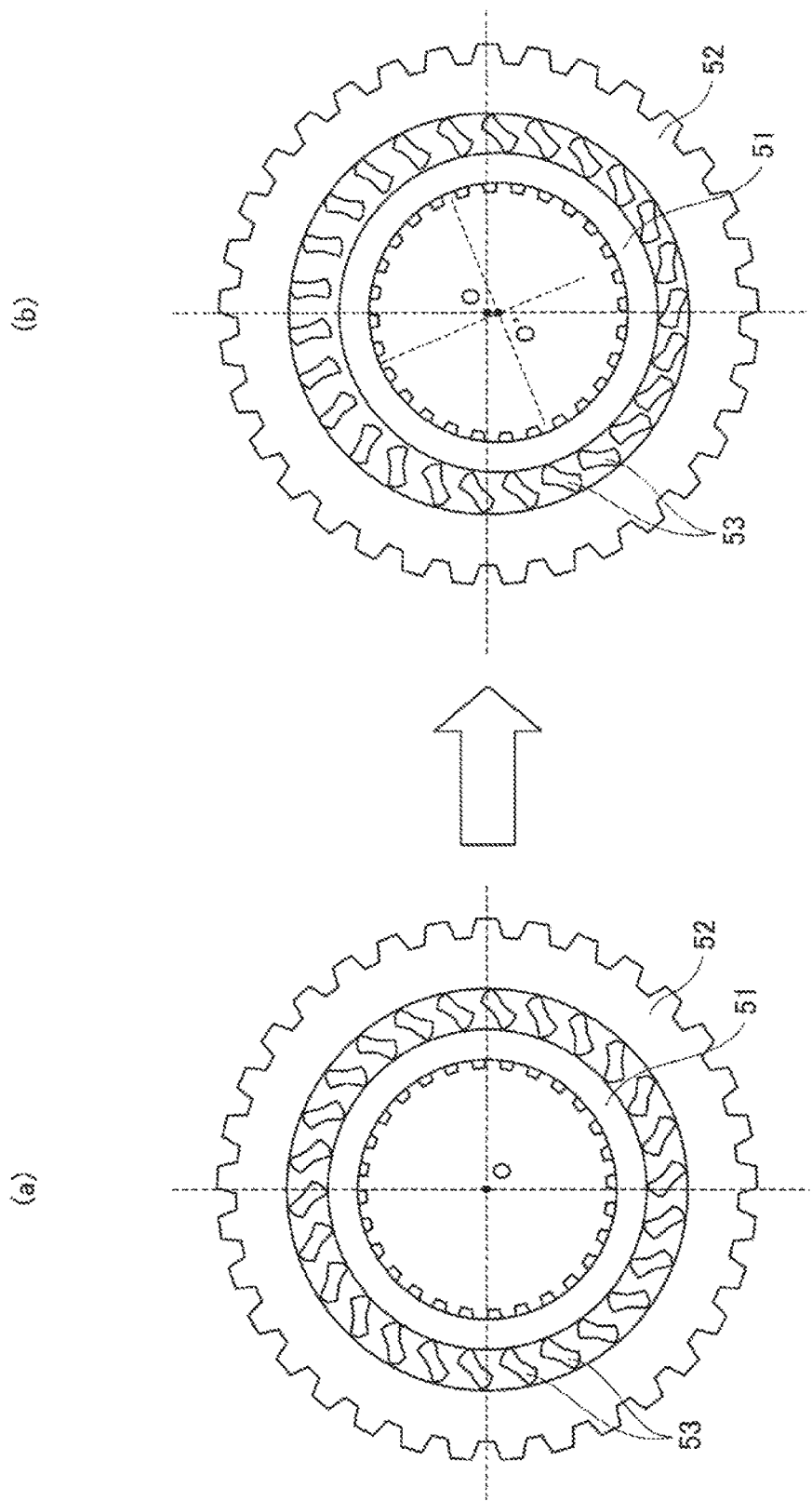
FIG. 13 is a schematic diagram of a one-way clutch in which (a) shows the one-way clutch that does not deviate, and (b) shows the one-way clutch that deviates.

On the other hand, in the case where a forward left and right torque stun of the first and second motors 2A, 2B is decreased, that is, the reverse left and right torque sum applied to the ring gears 24A. 24B is decreased, should the hydraulic brakes 60A, 60B be released, the inclined angle of the sprags 53 is decreased, according to which the torque transmission capacity of the one-way clutch 50 is decreased, and eventually, the one-way clutch 50 should be disengaged. However, the hydraulic brakes 60A, 60B are kept weakly applied, which keeps the ring gears 24A, 24B fixed, and therefore, the inner race 51 which are connected to the ring gears 24A, 24B are also kept fixed. Consequently, even though the forward left and right torque sum of the first and second motors 2A, 2B is decreased, the sprags 53 are left inclined at a predetermined inclined angle. In this way, in the event that the hydraulic brakes 60A, 60B are disposed in parallel to the one-way clutch 50 and that the hydraulic brakes 60A, 60B are applied weakly, the relative movement between the inner race 51 and the outer race 52 of the one-way clutch 50 is interrupted by the weak application of the hydraulic brakes 60A, 60B, and therefore, the automatic centering of the inner race 51 and the outer race 52 described above does not occur. This prevents the inclined angle of the sprags 53 from becoming uniform in a circumferential direction, and, for example, an inclined angle of the sprag 53 situated in a lower position becomes greater than an inclined angle of the sprag 53 which is situated in a higher position in the direction of gravity. As a result, a rotational axis O of the outer race 52 and a rotational axis O' of the inner race 51, which originally have the same axis as shown in (a) of FIG. 13, deviate downwards in the direction of gravity as shown in (b) of FIG. 13B, that is, the rotational axis O' of the inner race 51 deviates downwards in the direction of gravity relative to the rotational axis O of the outer race 52, which causes the one-way clutch 50 to be eccentric. In the case where the one-way clutch 50 is kept eccentric a predetermined magnitude or greater for a long period of time, there are fears that the durability of the one-way clutch 50 is lowered.

In a driving mode shown in FIG. 11, the one-way clutch 50 can be caused to be eccentric after the one-way clutch 50 is engaged (ON) and the hydraulic brakes 60A, 60B are weakly applied when the wheeled vehicle starts through EV start (an OWC's eccentricity generation area). Thereafter, since the hydraulic brakes 60A, 60B are not released until the wheeled vehicle cruises at high vehicle speed through high-speed ENG cruise, the one-way clutch 50 is kept eccentric even during ENG acceleration, regeneration, and middle-speed ENG cruising where the one-way clutch 50 does not contribute to transmission of the power (an OWC's eccentricity holding area). Then, when the wheeled vehicle is accelerated through ENG+EV acceleration, the one-way clutch 50 is engaged (ON) again, and the hydraulic brakes 60A, 60B are kept weakly applied as they are. Thus, the one-way clutch 50 is caused to be eccentric more (an OWC's eccentricity increasing area).

Then, in addition to the functions as the motor controller and the connection/disconnection unit controller, the controller 8 has a function as an eccentricity acquiring unit for acquiring an eccentricity of the one-way clutch 50 and releases the hydraulic brakes 60A, 60B forcibly when the controller 8 acquires the eccentricity which is equal to or greater than a predetermined magnitude. The controller 8 acquires an eccentricity of the one-way clutch 50 when the hydraulic brakes 60A, 60B are weakly applied and the first and second motors 2A, 2B side and the rear wheels Wr side are connected with each other. The eccentricity of the one-way clutch 50 may be detected directly from a sensor, not shown or may be estimated from the number of times of generation of torque where the left and right torque sum applied to the ring gears 24A, 24B becomes equal to or greater than the weakly applied limit transfer torque T1 of the hydraulic brakes 60A, 60B. In the event of the eccentricity of the one-way clutch being so estimated, the controller 8 has a counting unit, not shown, which acquires a number of times of generation of torque where the left and right torque sum applied to the ring gears 24, 24B becomes equal to or greater than the weakly applied limit transfer torque T1 and stores the number of times of generation so acquired. The magnitude of torque to be measured does not have to be completely the same as the weakly applied limit transfer torque T1 and hence can be set appropriately based on the toque transmission capacity of the hydraulic brakes 60A, 60B.

In the case where the eccentricity which is equal to or greater than the predetermined magnitude is detected by the sensor, not shown, or in the case where the eccentricity which is equal to or greater than the predetermined magnitude is estimated by the counting unit from the number of times of generation of torque which is greater than the weakly applied limit transfer torque T1, the controller 8 executes a forcible brake release to release the hydraulic brakes 60A, 60B.

<Brake Release Control>

Figure 14:
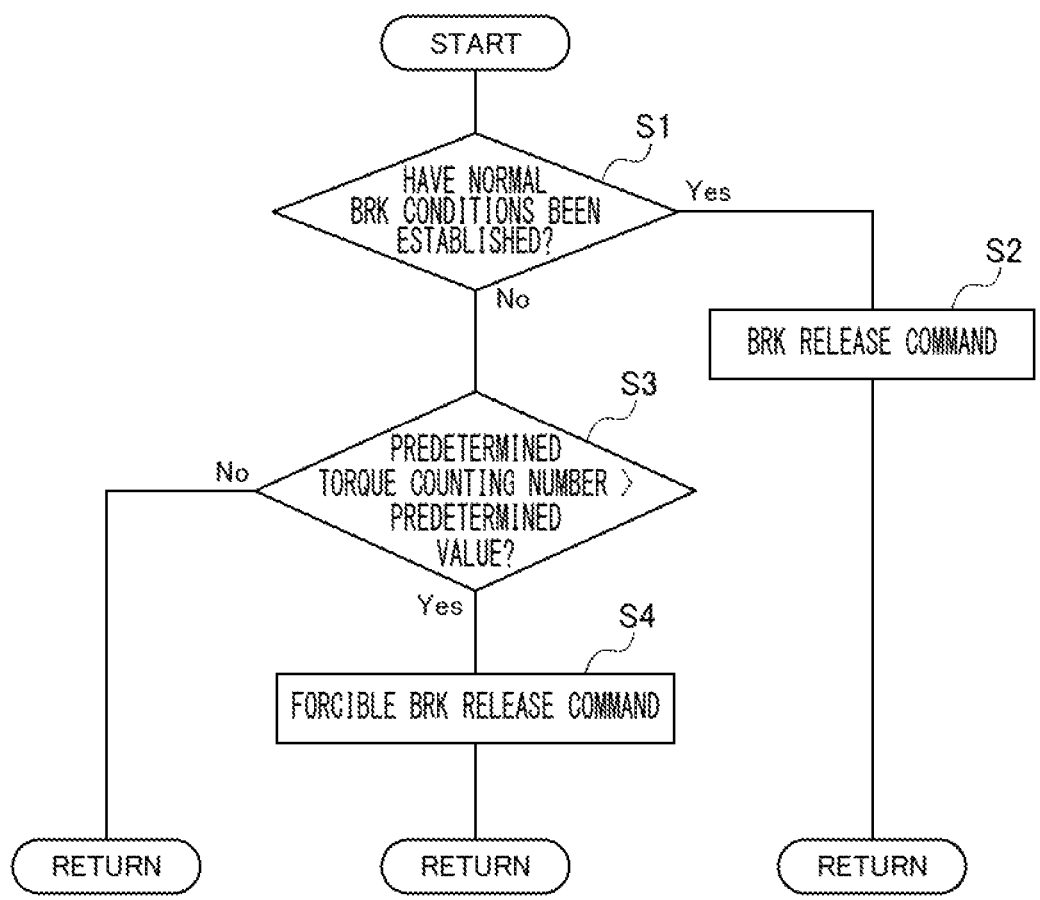
FIG. 14 is a flowchart explaining a brake release control.

Next, a brake release control of the hydraulic brakes 60A, 60B including the forcible brake release control will be described by reference to FIG. 14. In the following description, as an eccentricity acquiring method, a case will be described which employs the counting number of the number of times of generation of torque which is equal to or greater than the weakly applied limit transfer torque T1 by the counting unit.

In the brake release control of the hydraulic brakes 60A, 60B, firstly, whether or not normal brake release conditions are established is determined (S1). These normal brake release conditions are determined according to the driving states of the rear wheel driving system 1 (traveling forwards, reversing, vehicle speeds and the like) and are specified in advance according to the various states of the rear wheel driving system 1 which are explained in FIGS. 4 to 11. When the brake release conditions are established, a brake release command is outputted from the controller 8, and a normal brake release control to release the hydraulic brakes 60A, 60B is executed immediately (S2). For example, in FIG. 11, when the driving state of the vehicle is shifted from the ENG+EV acceleration in the middle vehicle speed range to the high-speed ENG cruise in the high vehicle speed range, a brake release command is outputted, whereby the hydraulic brakes 60A, 60B are released.

At this time, forward torque attempting to cause the wheeled vehicle to travel forwards is applied to the planetary carriers 23A, 23B from the axle shafts 10A. 10B, respectively, whereby the first and second motors 2A, 2B stop the power running drive. Thus, when the first and second motors 2A, 2B stop the power running drive, the forward left and right torque sum is applied to the ring gears 24A. 24B, that is, the inner race 51 in association with the reverse left and right torque sum based on the loss of the first and second motors 2A, 2B. When the forward left and right torque sum is applied to the inner race 51, the inner race 51 return to their initial positions and then start rotating forwards. When the inner race 51 return to their initial positions, as with the case where the one-way clutch 50 is used alone, the inclined angle of the sprags 53 becomes uniform along the full circumference of the one-way clutch 50, and therefore, the inner race 51 and the outer race 52 are automatically centered, whereby the eccentricity of the one-way clutch 50 is eliminated. In the controller 8, the counting number of the counting unit is reset to match the release of the hydraulic brakes 60A, 60B.

In S1, if the brake release conditions are not established, whether or not the counting number of the counting unit is greater than a predetermined value is detected (S3). As a result of the detection, if the counting number of the counting unit is greater than the predetermined value, the controller 8 determines that the one-way clutch 50 is eccentric equal to or more than the predetermined magnitude of eccentricity, and outputs a command to release the hydraulic brakes 60A, 60B forcibly (S4). If the counting number of the counting unit is equal to or smaller than the predetermined value, the controller 8 determines that the one-way clutch 50 is not eccentric or that the eccentricity falls within a permissible range, the brake release control ends.

<Forcible Brake Release Control for Driving Through FWD>

When a forcible release command to release the hydraulic brakes 60A. 60B forcibly is outputted from the controller 8 with the wheeled vehicle 3 driven through FWD, that is, with no forward left and right torque sum generated by the first and second motors 2A, 2B, the front wheels Wf are being driven by the front wheel driving system 6, and the hydraulic brakes 60A, 60B do not contribute to the transmission of power. Therefore, since a release within a short period of time is permitted at all times, the hydraulic brakes 60A, 60B are released immediately. At this time, as with the normal brake release control, releasing the hydraulic brakes 60A, 60B automatically centers the inner race 51 and the outer race 52, whereby the eccentricity of the one-way clutch 50 is eliminated.

Namely, in the event of the front wheel driving system 6 generating the forward torque when the eccentricity which is equal to or greater than the predetermined magnitude is acquired, the controller 8 releases the hydraulic brakes 60A. 60B. For example, in FIG. 11, the hydraulic brakes 60A, 60B are released during ENG acceleration and middle-speed ENG cruise.

<Forcible Brake Release Control for Driving Through RWD or AWD>

When a forcible release command to release the hydraulic brakes 60A, 60B forcibly is outputted from the controller 8 with the wheeled vehicle 3 driven through RWD or AWD, that is, with the first and second motor 2A, 2B generating the forward left and right torque sum, the controller 8 waits to release the hydraulic brakes 60A, 60B until the forward left and right torque stun becomes substantially zero and releases the hydraulic brakes 60A, 60B at a predetermined timing (A) or (B) which will be described later. Even though the hydraulic brakes 60A, 60B are released while the first and second motors 2A, 2B are generating the forward left and right torque sum, that is, while the reverse left and right torque sum is being applied to the ring gears 24A, 24B, the one-way clutch 50 is kept engaged, and the eccentricity of the one-way clutch 50 is not eliminated. Therefore, the hydraulic brakes 60A. 60B can be restricted from being released by waiting until the forward left and right torque sum of the first and second motors 2A, 2B come down to the vicinity of zero.

(A) at the Time of Driving Through FWD

A brake release control in which the hydraulic brakes 60A, 60B are released forcibly after waiting until the wheeled vehicle 3 is driven through FWD, that is, a forcible brake release control performed when the wheeled vehicle 3 is being driven trough FWD is similar to the (<Forcible Brake Release Control>) described above, and hence, the description thereof will be omitted here.

(B) at the Time of Shifting to Regenerative Drive

When the rear wheel driving system 1 receives a regenerative drive command, normally, the hydraulic brakes 60A, 60B are controlled to be applied immediately and the first and second motors 2A, 2B are controlled to execute a regenerative drive. However, in the case of a forcible release command to release the hydraulic brakes 60A, 60B being outputted from the controller 8, the release of the hydraulic brakes 60A. 60B is inserted before the regenerative drive of the first and second motors 2A, 2B in an interrupting fashion, and further, the first and second motors 2A, 2B are controlled to perform a reverse power running drive so as to generate a reverse left and right torque sum, that is, so that the forward left and right torque sum is applied to the ring gears 24A, 24B. At this time, although the eccentricity of the one-way clutch 50 is eliminated by releasing the hydraulic brakes 60A, 60B in the similar way done during the normal brake release control. However, in the normal brake release control, the forward left and right torque sum applied to the ring gears 24A, 24B is the left and right torque stun generated in association with the reverse left and right torque sum generated by the loss associated with the stop of the first and second motors 2A, 2B, whereas when the first and second motors 2A, 2B are driven reversely through power running drive, the forward left and right torque sum applied to the ring gears 24A, 24B is the left and right torque sum generated in association with the reverse left and right torque sum generated by the reverse power running drive of the first and second motors 2A. 2B. Therefore, the inner race 51 return to their initial positions early.

Figure 15:
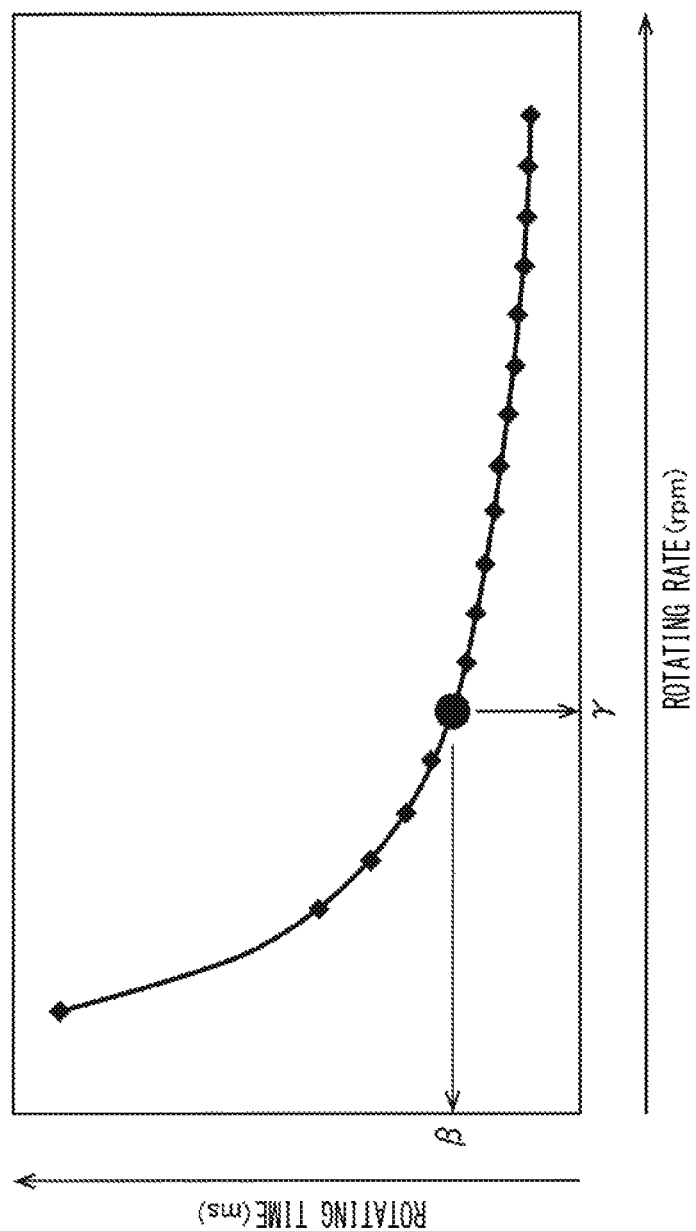
FIG. 15 is a graph showing a relationship between a rotating time and a rotating speed of an inner race for the inner race to rotate in the other direction.

In this control, the generating time and generating rate which are the generation amount of the reverse left and right torque sum of the first and second motors 2A, 2B, that is, forward left and right torque sum applied to the ring gears 24A, 24B which are necessary to return the inner race 51 to their initial positions are determined based on the maximal inclined angle α of the sprags 53 which is obtained based on the maximal value T2 of the reverse left and right torque sum applied to the ring gears 24A, 24B. The rotating time for rotating the inner race 51 by the amount equal to the maximal inclined angle α in the forward direction and the rotating rate of the inner race 51 are obtained from a graph shown in FIG. 15. FIG. 15 shows the graph in which the rotating time of the inner race 51 when the inner race 51 are rotated in the forward direction by the amount equal to the maximal inclined angle α is plotted along an axis of ordinates and the rotating rate is plotted along an axis of abscissas.

It is found from FIG. 15 that the inner race 51 should be rotated in the forward direction at a rate of γ (rpm) in order to end the control at β (ms), for example. A reverse left and right torque stun value for the first and second motors 2A, 2B is calculated in consideration of the gear ratios of the first and second planetary type speed reducers 12A, 12B.

In this way, when the start of the regenerative drive of the first and second motors 2A, 2B, that is, the start of generating a braking force by the rear wheel driving system 1 is delayed, a braking force is generated from wheel brakes, not shown, so as to compensate for the delay in the start of generating a regenerative drive torque from the first and second motors 2A, 2B. In this way, since the braking force can also be generated by the wheel brakes other than the first and second motors 2A, 2B, the braking force required by the whole of the wheeled vehicle can be satisfied.

Although the eccentricity of the one-way clutch 50 is eliminated only by stopping the first and second motors 2A, 2B when the brakes are released as in the normal brake release control, since the start of the regenerative drive is waited for, it is preferable to cause the first and second motors 2A, 2B to perform a reverse power running drive so that the elimination of eccentricity of the one-way clutch 50 is completed within a shorter period of time.

Although the eccentricity of the one-way clutch 50 is eliminated by stopping once the power running drive of the first and second motors 2A, 2B or causing the first and second motors 2A. 2B to perform a reverse power running drive when the first and second motors 2A, 2B generate a forward left and right torque sum, the eccentricity of the one-way clutch 50 can be eliminated while satisfying a braking force required to brake the rear wheels by inserting the release of the hydraulic brakes 60A, 60B before the regenerative drive of the first and second motors 2A, 2B in an interrupting fashion. In the driving mode depicted in FIG. 11, although a shift from the power running drive of the first and second motors 2A, 2B to the regenerative drive thereof is not depicted, for example, in the event of regeneration being performed after EV acceleration, the hydraulic brakes 60A, 60B are released when the driving mode of the first and second motors 2A, 2B is shifted from the power running drive to the regenerative drive.

Also in the event of the hydraulic brakes 60A, 60B being released forcibly after waiting until FWD, the first and second motors 2A, 2B may be driven to perform a reverse power running drive.

Thus, as has been described heretofore, according to the embodiment, in addition to the functions as the motor controller and the connection/disconnection unit controller, the controller 8 has the function as the eccentricity acquiring unit for acquiring the eccentricity of the one-way clutch 50, and therefore, the eccentricity of the one-way clutch 50 can be acquired. When the eccentricity that is equal to or greater than the predetermined magnitude is acquired, even in the case where the normal BRK release conditions are not satisfied under the predetermined driving conditions, the eccentricity of the one-way clutch 50 can be eliminated by releasing the hydraulic brakes 60A, 60B forcibly.

The eccentricity of the one-way clutch 50 can also be eliminated by acquiring that the first and second motors 2A, 2B generate a forward torque which is equal to or greater than the predetermined magnitude of torque with the hydraulic brakes 60A, 60B being applied so that the first and second motors 2A, 2B side and the rear wheels Wr side are connected together, and controlling the hydraulic brakes 60A, 60B by the controller 8 based on the number of times of generation of such torque.

The invention is not limited to the embodiment that has been described heretofore and hence can be modified or improved as required.

For example, the ring gears 24A, 24B do not have to be provided with the hydraulic brakes 60A. 60B, and hence, at least one connection/disconnection unit such as a hydraulic brake and one unidirectional power transmitting unit such as a one-way clutch should be provided on the ring gears 24A, 24B which are connected together.

Although the hydraulic brakes are described as the connection/disconnection unit, the invention is not limited thereto, and hence, a mechanically driven or electromagnetically driven type brake can be selected arbitrarily.

Although the first and second motors 2A, 2B are connected to the sun gears 21A. 21B and the ring gears are connected together, the invention is not limited thereto, and hence, the sun gears may be connected together with the first and second motors connected to the ring gears.

Although the connection/disconnection unit and the unidirectional power transmitting unit are disposed on one of the three elements which constitute a differential unit, the invention is not limited thereto, and hence, the connection/disconnection unit and the unidirectional power transmitting unit may be disposed on a simple power transmitting portion between a rotary member and a rotary member.

The two drive sources do not have to be provided, and hence, a mechanism may be provided in which a driven portion is driven by one drive source.

The front wheel driving system may be such that a drive source uses a motor as a single drive source without using an internal combustion engine.

Other power generating units such as an internal combustion engine may be used as a power supply in place of the motors.

The application of the driving system of the invention is not limited to the wheeled vehicle, and hence, the driving system of the invention may be applied to vessels or aircraft, for example.

This patent application is based on the Japanese Patent Application (No. 2013-265801) filed on Dec. 24, 2013, the contents of which are incorporated herein by reference.

DESCRIPTION OF REFERENCE NUMERALS AND CHARACTERS 1 rear wheel driving system (driving system)
2A first motor (drive source)
2B second motor (drive source)
3 wheeled vehicle (vehicle)
4 internal combustion engine (another drive source)
5 motor (another drive source)
8 controller (drive source controller, connection/disconnection unit controller, eccentricity acquiring unit, counting unit)
50 one-way clutch (unidirectional power transmitting unit)
51 inner race (first member)
52 outer race (second member)
53 sprag (engaging element)
60A, 60B hydraulic brake (connection/disconnection unit)
Wf front wheel (second drive wheel)
Wr rear wheel (driven portion, first drive wheel)
O rotational axis of outer race
O' rotational axis of inner race

The invention claimed is:

1. A driving system for a vehicle comprising:
   a drive source;
   a driven portion, which is driven by the drive source to propel a vehicle;
   a unidirectional power transmitting unit, which is provided on a power transmission path between the drive source and the driven portion, and which is engaged when rotational power in one direction on a drive source side is inputted into a driven portion side, is disengaged when rotational power in the other direction on the drive source side is inputted into the driven portion side, is disengaged when rotational power in one direction on the driven portion side is inputted into the drive source side, and is engaged when rotational power in the other direction on the driven portion side is inputted into the drive source side;
   a connection/disconnection unit, which is provided on the power transmission path in parallel to the unidirectional power transmitting unit so as to connect or disconnect the power transmission path by being applied or released; and
   a connection/disconnection unit controller, which controls a release and an application of the connection/disconnection unit, wherein:
   the driving system further comprises a counting unit, which acquires a fact that the drive source generates rotational power in the one direction having a magnitude of torque equal to or greater than a predetermined magnitude of torque when the connection/disconnection unit is applied to connect the drive source side and the driven portion side together, and then which stores a generation number of times that the rotational power generated by the drive source in the one direction equals or exceeds the predetermined magnitude of torque; and
   the connection/disconnection unit controller controls the connection/disconnection unit based on the generation number of times stored in the counting unit.

2. The driving system for a vehicle according to claim 1, wherein
   the connection/disconnection unit controller releases the connection/disconnection unit when the generation number of times stored in the counting unit is equal to or greater than a predetermined number of times.

3. The driving system for a vehicle according to claim 2, wherein
   when the generation number of times is equal to or greater than the predetermined number of times with the drive source generating rotational power in the one direction, the connection/disconnection unit controller waits the release of the connection/disconnection unit until rotational power in the one direction becomes substantially zero.

4. The driving system for a vehicle according to claim 2, wherein
   when the generation number of times is equal to or greater than the predetermined number of times with the drive source generating rotational power in the one direction, the connection/disconnection unit controller keeps the application of the connection/disconnection unit until a command to the drive source is switched to a command commanding the drive source to generate rotational power in the other direction, and releases the connection/disconnection unit after the drive source ends generating rotational power in the one direction and before the drive source starts generating rotational power in the other direction.

5. The driving system for a vehicle according to claim 4, wherein:
   the vehicle is a wheeled vehicle;
   the driven portion is a wheel of the wheeled vehicle;
   the wheeled vehicle comprises a brake unit, which brakes a rotation of the wheel; and
   when the connection/disconnection unit is released before the drive source starts generating rotational power in the other direction,
   the brake unit is caused to generate a braking force that complements rotational power in the other direction so as to compensate for a delay in start of generating rotational power in the other direction from the drive source.

6. The driving system for a vehicle according to claim 2, wherein:
   the vehicle is a wheeled vehicle;
   the driven portion is a first drive wheel that is either of a front wheel and a rear wheel of wheels of the wheeled vehicle;
   the wheeled vehicle comprises another drive source, which is configured to drive a second drive wheel that is the other of the front wheel and the rear wheel; and
   when the generation number of times is equal to or greater than the predetermined number of times with the another drive source generating rotational power in the other direction, the connection/disconnection unit controller releases the connection/disconnection unit.

7. The driving system for a vehicle according to claim 2, comprising a drive source controller, which controls rotational power generated by the drive source, wherein the drive source controller controls so that rotational power in the other direction is generated from the drive source when the connection/disconnection unit controller releases the connection/disconnection unit.

8. The driving system for a vehicle according to claim 7, wherein:
an engaging element of the unidirectional power transmitting unit is interposed so that an inclined angle increases as the rotational power in the one direction of the drive source increases; and
the drive source controller determines a generation amount of rotational power in the other direction based on a maximal inclined angle of the engaging element that is obtained based on a maximal generated rotational power in the one direction that is generated by the drive source.

9. The driving system for a vehicle according to claim 1, wherein
the predetermined magnitude is determined based on a rotational power transmission capacity of the connection/disconnection unit.

* * * * *